United States Patent
Hirani et al.

(10) Patent No.: US 8,645,260 B2
(45) Date of Patent: Feb. 4, 2014

(54) SYSTEMS AND METHODS FOR MARKET ORDER VOLUME CLEARING IN ONLINE TRADING OF CREDIT DERIVATIVES

(75) Inventors: Sunil G. Hirani, Bedford Corners, NY (US); Mark A. Rowell, London (GB)

(73) Assignee: Creditex Group, Inc., New York, NY (US)

( * ) Notice: Subject to any disclaimer, the term of this patent is extended or adjusted under 35 U.S.C. 154(b) by 484 days.

(21) Appl. No.: 13/039,741

(22) Filed: Mar. 3, 2011

(65) Prior Publication Data

US 2011/0153488 A1  Jun. 23, 2011

Related U.S. Application Data

(60) Division of application No. 12/197,395, filed on Aug. 25, 2008, now Pat. No. 7,970,693, and a continuation-in-part of application No. 10/954,629, filed on Sep. 29, 2004, now Pat. No. 7,698,208, and a continuation-in-part of application No. 10/957,217, filed on Oct. 1, 2004, now Pat. No. 7,716,114, and a continuation of application No. 11/837,159, filed on Aug. 10, 2007, now abandoned, said application No. 10/954,629 is a continuation-in-part of application No. 10/316,167, filed on Dec. 9, 2002, now Pat. No. 7,587,355, said application No. 10/957,217 is a continuation-in-part of application No. 10/316,167, said application No. 11/837,159 is a continuation-in-part of application No. 10/316,167.

(60) Provisional application No. 60/988,009, filed on Nov. 14, 2007, provisional application No. 60/957,823, filed on Aug. 24, 2007.

(51) Int. Cl.
*G06Q 40/00* (2012.01)

(52) U.S. Cl.
USPC .......................................... 705/37

(58) Field of Classification Search
USPC .......................................... 705/37
See application file for complete search history.

(56) References Cited

U.S. PATENT DOCUMENTS

| | | | |
|---|---|---|---|
| 5,872,725 | A | 2/1999 | Ninomiya et al. |
| 5,950,176 | A | 9/1999 | Keiser et al. |

(Continued)

OTHER PUBLICATIONS

Willa E. Gibson (1999) "Are Swap Agreements Securities or Futures?: The Inadequacies of Applying the Traditional Regulatory Approach to OTC Derivatives Transactions," University of Iowa, vol. 24, section II.E, 54 pages.

(Continued)

*Primary Examiner* — Jessica Lemieux
(74) *Attorney, Agent, or Firm* — DLA Piper LLP (US)

(57) ABSTRACT

Systems and methods for market order volume clearing in online trading of credit derivatives are disclosed. In one embodiment, a method for market order volume clearing may comprise: selecting, from a plurality of credit derivatives, at least one most liquid credit derivative; determining a volume clearing price level for the selected credit derivative; inviting trading clients of the electronic trading system to submit, within a time limit, buy orders and sell orders for the selected credit derivative at the volume clearing price level, each buy order or sell order specifying a desired volume; matching the buy orders and the sell orders submitted within the time limit to maximize a total notional amount of the selected credit derivative that can be traded at the volume clearing price level; and completing trades at the volume clearing price level according to the matching of orders.

11 Claims, 31 Drawing Sheets

(56) References Cited

U.S. PATENT DOCUMENTS

| | | | |
|---|---|---|---|
| 5,970,479 | A | 10/1999 | Shepherd |
| 6,304,858 | B1 | 10/2001 | Mosler et al. |
| 6,317,727 | B1 | 11/2001 | May |
| 6,347,307 | B1 | 2/2002 | Sandhu et al. |
| 6,363,360 | B1 | 3/2002 | Madden |
| 6,377,940 | B2 | 4/2002 | Tilfors et al. |
| 6,405,180 | B2 | 6/2002 | Tilfors et al. |
| 6,408,282 | B1 | 6/2002 | Buist |
| 6,421,653 | B1 | 7/2002 | May |
| 6,505,174 | B1 | 1/2003 | Keiser et al. |
| 6,560,580 | B1 * | 5/2003 | Fraser et al. ............... 705/36 R |
| 6,618,707 | B1 | 9/2003 | Gary |
| 6,725,201 | B2 | 4/2004 | Joao |
| 6,996,540 | B1 | 2/2006 | May |
| 7,177,833 | B1 | 2/2007 | Marynowski et al. |
| 7,212,997 | B1 | 5/2007 | Pine et al |
| 7,251,629 | B1 | 7/2007 | Marynowski et al. |
| 7,266,521 | B1 | 9/2007 | Handa et al. |
| 7,333,950 | B2 | 2/2008 | Shidler et al. |
| 7,392,220 | B1 * | 6/2008 | Altarescu ..................... 705/38 |
| 2001/0037284 | A1 | 11/2001 | Finkelstein et al. |
| 2001/0056393 | A1 | 12/2001 | Tilfors et al. |
| 2002/0042765 | A1 | 4/2002 | Dawson |
| 2002/0052822 | A1 | 5/2002 | Terahima |
| 2002/0055897 | A1 | 5/2002 | Shidler et al. |
| 2002/0099651 | A1 | 7/2002 | May |
| 2002/0116288 | A1 | 8/2002 | Nakajima et al. |
| 2002/0116314 | A1 * | 8/2002 | Spencer et al. ............... 705/37 |
| 2002/0116317 | A1 | 8/2002 | May |
| 2002/0161693 | A1 | 10/2002 | Greenwald |
| 2002/0194107 | A1 | 12/2002 | Li et al. |
| 2003/0018561 | A1 | 1/2003 | Kitchen et al. |
| 2003/0083978 | A1 | 5/2003 | Brouwer |
| 2003/0115129 | A1 | 6/2003 | Feaver et al. |
| 2003/0224854 | A1 | 12/2003 | Joao |
| 2004/0024692 | A1 | 2/2004 | Turbeville |
| 2004/0111355 | A1 | 6/2004 | Hirani et al. |
| 2004/0162862 | A1 | 8/2004 | Hull et al. |
| 2004/0236636 | A1 | 11/2004 | Lutnick et al. |
| 2005/0097029 | A1 | 5/2005 | Cooper |
| 2005/0149426 | A1 | 7/2005 | Jokisch et al. |
| 2005/0149428 | A1 | 7/2005 | Gooch et al. |
| 2006/0036534 | A1 | 2/2006 | Hirani et al. |
| 2006/0036535 | A1 | 2/2006 | Hirani et al. |
| 2006/0143099 | A1 | 6/2006 | Partlow et al. |
| 2006/0242061 | A1 | 10/2006 | Axilrod |

OTHER PUBLICATIONS

Derivatives Week, "Learning Curve, Tradeable Credit Fixings," Mar. 25, 2008. pp. 7-9.
BBA—British Banker's Association, "The BBA LIBOR fixing & definition," Nov. 7, 2002.
"Poll: What is the Delta of the ITraxx Equity Tranche?," Wilmott forums, Nov. 15, 2004, <http://www.wilmott.com/messageview.cfm?catid=4&threadid=21942>.
"Creditex, Markit and Major Dealers Launch Tradeable Credit Fixings," Mar. 21, 2005.

* cited by examiner

| iTraxx | | | |
|---|---|---|---|
| BUYER | BUY | SELL | SELLER |
| 1 | 25MM | 50MM | 1 |
| 2 | 50MM | 50MM | 2 |
| 3 | 25MM | 25MM | 3 |
| 4 | 100MM | | |

1102

TICKETS
BUYER 1 x SELLER 3 IN 25MM
BUYER 2 x SELLER 1 IN 50MM
BUYER 3 x SELLER 2 IN 25MM
BUYER 4 x SELLER 2 IN 25MM

Tradeable Credit Spread Fixing

*Tradeable Credit Spread Fixings*

The fixings contribution period is in process. Enter your two-way markets below before time expires.

4:57  [Cancel All]

DJ iTraxx 5y

| Credit | Size | My Market | | Fixing | | | Volume/Clearing | | | My Trades | |
|---|---|---|---|---|---|---|---|---|---|---|---|
| | | Bid | Offer | Mid | Dlrs | Buy | Sell | | Bought | Sold |
| Europe | 25MM | 32 | 33 | | | | | | | | |
| HiVol | 25MM | 53 | 54 | | | | | | | | |
| Crossover | 10MM | 231 | 235 | | | | | | | | |

DJ iTraxx Europe 5y

| Methodology | Bid | Mid | Offer |
|---|---|---|---|
| Basic | | | |
| Trades Capped | | | |
| Trades Excluded | | | |

Guidelines 1202 1204 1206 1208 1210 1212 1214 1216 1218

FIG. 9A

Tradeable Credit Spread Fixing

*Tradeable Credit Spread Fixings*

4:56  [Cancel All]

The Volume Clearing period is in process. Enter your orders before time expires.

Guidelines

| Credit | Size | My Market | | Fixing | | Volume Clearing | | My Trades | |
|---|---|---|---|---|---|---|---|---|---|
| | | Bid | Offer | Mid | Dlrs | Buy | Sell | Bought | Sold |
| DJ iTraxx 5y | | | | | | | | | |
| Europe | 25MM | 32 | 33 | 31.25 | 9 | 50MM | | 25MM | |
| HiVol | 25MM | 52 | 54 | 53.75 | 9 | 75MM | 40MM | | |
| Crossover | 10MM | 231 | 235 | 235.25 | 8 | | | | 10MM |

DJ iTraxx Europe 5y

| Methodology | Bid | Mid | Offer |
|---|---|---|---|
| Basic | 31.25 | 31.25 | 31.5 |
| Trades Capped | 30.75 | 31.25 | 31.81 |
| Trades Excluded | 30.2 | 31.25 | 32.1 |

FIG. 9B

Tradeable Credit Spread Fixing

*Tradeable Credit Spread Fixings*                                                                 Guidelines The Volume Clearing period is in process. Enter your orders before time expires.

[Closed] [Cancel All]
   1204

DJ iTraxx 5y

| Credit | My Market 1206 1208 | | | Fixing 1210 | | Volume Clearing 1212 1214 | | My Trades 1216 | |
|---|---|---|---|---|---|---|---|---|---|
| | Size | Bid | Offer | Mid | Dlrs | Buy | Sell | Bought | Sold |
| Europe | 25MM | 32 | 33 | 31.25 | 9 | 50MM | | 75MM | |
| HiVol | 25MM | 52 | 54 | 53.75 | 9 | 75MM | | | |
| Crossover | 10MM | 231 | 235 | 235.25 | 8 | | 40MM | | 30MM |

1218

DJ iTraxx Europe 5y

| Methodology | Bid | Mid | Offer |
|---|---|---|---|
| Basic | 31.25 | 31.25 | 31.5 |
| Trades Capped | 30.75 | 31.25 | 31.81 |
| Trades Excluded | 30.2 | 31.25 | 32.1 |

FIG. 9C

| Scenario Description | Last Trade Price | Last Trade Time | Bid Time | Bid Price | Offer Price | Offer Time | Suggested VC Level | Comment |
|---|---|---|---|---|---|---|---|---|
| Last trade and last bid & offer. Last trade after bid & offer. | 11 | 09:05 | 09:00 | 10 | 11 | 09:01 | 11 | |
| Last trade and last bid & offer. Last trade before bid & offer | 11 | 08:55 | 09:00 | 10 | 15 | 09:01 | 12.5 | |
| Last trade and last bid & offer. Bid after last trade, offer before. Last bid < last trade | 11 | 09:05 | 13:00 | 10 | 12 | 09:00 | 11 | Last bid after last trade but last bid lower than last trade, so use last trade. |
| Last trade and last bid & offer. Bid after last trade, offer before. Last bid > last trade | 11 | 09:05 | 13:00 | 12 | 15 | 09:00 | 12 | Last bid after trade and higher, so use last bid |
| Last trade and last bid & offer. Offer after last trade, bid before. Last offer < last trade | 13 | 09:05 | 09:00 | 11 | 12.5 | 13:00 | 12.5 | |
| Last trade and last bid & offer. Offer after last trade, bid before. Last offer > last trade | 13 | 09:05 | 09:00 | 11 | 14 | 13:00 | 13 | |
| Last trade but no bid or offer. | 11 | 08:55 | | | | | 11 | |
| No last trade but a bid and offer. Prices not crossed. Odd number of ticks market. Offer later than bid | | | 09:00 | 11 | 11.75 | 13:00 | 11.5 | Due to odd number of ticks (3) market and offer later than bid, favour the offer |
| No last trade but a bid and offer. Prices not crossed. 1 tick market. Bid later than offer | | | 13:00 | 11 | 11.25 | 09:00 | 11 | Due to 1 tick market and bid later than offer, favour the bid |
| No last trade but a bid and offer. Prices not crossed | | | 09:00 | 11 | 15 | 13:00 | 13 | The bid/offer spread is an even number of ticks so use the mid as the VC level |
| No last trade but a bid and offer. Prices crossed. Offer later than bid | | | 09:00 | 11 | 9.75 | 13:00 | 9.75 | Due to crossed market and offer later use this. |
| No last trade but a bid and offer. Prices crossed. Bid later than offer | | | 13:00 | 11.25 | 10.75 | 09:00 | 11.25 | Due to crossed market and bid later use this. |
| Last trade and only a bid. Bid later than last trade and less than last trade. | 11 | 09:05 | 13:00 | 10.5 | | | 11 | |
| Last trade and only a bid. Bid earlier than last trade and less than last trade. | 11 | 09:05 | 08:30 | 10.5 | | | 11 | |
| Last trade and only a bid. Bid later than last trade and greater than last trade. | 11 | 09:05 | 13:00 | 11.25 | | | 11.25 | |
| Last trade and only a bid. Bid earlier than last trade and greater than last trade. | 11 | 09:05 | 08:30 | 12 | | | 11 | |
| Last trade and only an offer. Offer later than last trade and less than last trade. | 11 | 09:05 | | | 10.5 | 13:00 | 10.5 | |
| Last trade and only an offer. Offer earlier than last trade and less than last trade. | 11 | 09:05 | | | 10.5 | 08:30 | 11 | |
| Last trade and only an offer. Offer later than last trade and greater than last trade. | 11 | 09:05 | | | 11.25 | 13:00 | 11 | |
| Last trade and only an offer. Offer earlier than last trade and greater than last trade. | 11 | 09:05 | | | 12 | 08:30 | 11 | |

FIG. 11A

| Ranking | Ref | Description | Display Name | Display Term | Trade Count | Total Trade notional | Total order notional | Trade | Trade time | Bid time | Bid | Offer | Offer time | Suggested VC level |
|---|---|---|---|---|---|---|---|---|---|---|---|---|---|---|
| 1 | 515404 | European Autos | DCX | 5Y | 1 | 5.0 | 55.0 | 40 | 09:37:20 | 11:27:53 | 40 | 42 | 10:29:28 | 41 |
| 2 | 515402 | European Autos | VLVY | 5Y | 1 | 5.0 | 15.0 | 25 | 07:17:25 | 10:27:26 | 24 | 29 | 06:15:01 | 25 |
| 1 | 516010 | European Consumers | MKS | 5Y | 6 | 50.0 | 155.0 | 37 | 12:47:11 | 13:01:27 | 36 | 44 | 12:53:19 | 40 |
| 2 | 516014 | European Consumers | BAA | 5Y | 3 | 41.3 | 122.0 | 39 | 10:35:09 | 10:40:06 | 38 | 40 | 11:37:46 | 39 |
| 1 | 517701 | European Crossover | GLENCR | 5Y | 1 | 10.0 | | 63 | 07:12:52 | | | 50 | 05:04:54 | 63 |
| 2 | 532857 | European Crossover | GLENCR | 4Y | 0 | | 20.0 | | | 07:33:42 | 60 | 65 | 07:33:52 | 62.5 |
| 1 | 515622 | European Energy | VEFP | 5Y | 2 | 10.00 | 30.0 | 22 | 08:57:36 | 08:59:52 | 21 | 23 | 08:29:40 | 22 |
| 2 | 515605 | European Energy | ELEPOR | 5Y | 0 | | 10.0 | | | 08:29:40 | 10 | 14 | 08:29:40 | 12 |
| 1 | 516654 | European Financials | CAPIN | 10Y | 0 | | 75.0 | | | 11:25:28 | 15 | 18 | 11:25:28 | 16.5 |
| 2 | 181 | European Financials | LAVORO | 5Y | 0 | | 70 | | | 11:25:28 | 6 | 9 | 11:25:28 | 7.5 |
| 1 | 515985 | European Industrials | AALLN | 5Y | 2 | 15.0 | 45.0 | 14 | 09:31:08 | 10:27:26 | 13 | 15 | 10:19:13 | 14 |
| 2 | 515747 | European Industrials | DEGUSS | 5Y | 1 | 5.0 | 200.0 | 73 | 09:22:45 | 12:15:57 | 70 | 73 | 12:15:57 | 71.5 |
| 1 | 516066 | European Insurers | ASSGEN SUB | 10Y | 0 | | 25.0 | | | 02:42:00 | 25 | 30 | 11:36:07 | 27.5 |
| 2 | 516069 | European Insurers | HANRUE SUB | 10Y | 0 | | 25.0 | | | 02:42:17 | 39 | 43 | 11:36:07 | 41 |
| 1 | 515452 | European TMT | KPN | 5Y | 0 | | 40.0 | | | 09:29:09 | 52 | 57 | 09:23:34 | 54.5 |
| 2 | 515454 | European TMT | OTE | 5Y | 0 | | 5.0 | | | 04:35:32 | 30 | 34 | 07:11:26 | 32 |
| 1 | 527492 | iTraxx | S6 XOVER | 5Y | 84 | 1085.0 | 2,790.0 | 210 | 13:52:39 | 13:59:46 | 208 | 212 | 13:57:56 | 210 |
| 2 | 527493 | iptraxx | S6 HIVOL | 5Y | 33 | 1050.0 | 2,800.0 | 44.5 | 11:42:08 | 13:57:56 | 44 | 45 | 13:57:56 | 44.5 |

FIG. 11B

EOD VC Control Screen

Set Launch Time To: 17:00 BST — 1301
EOD VC Enabled: ☑ — 1303
Set Top 5 Publish Time To: 12:00 BST — 1305

| Credit | Term | Level | No. of Trades | Notional Traded | Rank | Include |
|---|---|---|---|---|---|---|
| LMETEL | 5Y | 43 | 2 | 10MM | 1 | ☑ — 1307 |
| SIEM | 5Y | 21 | 1 | 5MM | 2 | ☑ |
| NOKIA | 10Y | 30 1/2 | | | 3 | ☑ — 1307 |
| PHG | 10Y | 55 1/2 | | | 3 | ☑ |
| PHG | 5Y | 31 | | | 5 | |
| SIEM | 10Y | 30 | | | 5 | |
| STM | 5Y | 32 | | | 5 | |
| NOKIA | 5Y | 14 | | | 6 | |

Confirm   Close

Java Application Window

FIG. 13

| Credit | Term | Last Trade |
|---|---|---|
| VW | 5Y | < @19 in 10MM |
| DSM | 5Y | > @33 in 10MM |
| CIBASC | 5Y | < @45 in 10MM |
| BSNSA | 5Y | < @34 in 10MM |
| MKS | 5Y | < @40 in 10MM |

| Today's Activity | Today's Trades | Hot Bank Trades | Top 5 S/N's | | 12:33 PM |
|---|---|---|---|---|---|

FIG. 14

VolumeClearing creditex®

VolumeClearing
Anonymity Guaranteed

☑ Creditex sees Direction ONLY after VC ⓘ

Active and Expired ▼

| Time | Credit | Level | Total Size (MM) | | Trade Results | Repost if Unfilled |
|---|---|---|---|---|---|---|
| | | | Buy | Sell | | |
| Expired | LMETEL 5Y Sep '12 | 42 | | | 0 of 10 Done | ☐ |
| Expired | SEM 5Y Sep '12 | 21 | | | 0 of 20 Done | ☐ |
| Expired | NCHA 10Y Sep '12 | 30 1/2 | | | | ☐ |
| Expired | PHG 10Y Sep '12 | 55 1/2 | | | | |

ABH's Trades

| Type | Credit | Level | Amount | Buyer | Seller |
|---|---|---|---|---|---|

Close

Copyright © 2002 - 2007 Creditex Group Inc. All Rights Reserved. Patents Pending.

Java Application Window

FIG. 15

FIG. 18 creditex®

VolumeClearing
Anonymity Guaranteed

☑ Creditex sees Direction ONLY after VC

Active and Expired ▼

| Time | Credit | Level | Total Size (MM) | | Trade Results | Repost if Unfilled |
|---|---|---|---|---|---|---|
| | | | Buy | Sell | | |
| 2:19 PM | ITRX S8 EUR 5Y | 37 | | | 25 of 25 Done | ☐ |
| 2:19 PM | ITRX S8 EUR 10Y | 11 | | | 25 of 25 Done | ☐ |
| Priority | ⊙ VC KIGO 5Y Nov '12 | 35 | | | | ☐ |
| Priority | △ VC SKM 5Y Nov '12 | 29 | ⊗ 10MM | ⊗ 5MM | | |

LEH's Trades

| Type | Credit | Level | Amount | Buyer | Seller |
|---|---|---|---|---|---|

Close

Copyright © 2002 - 2007 Creditex Group Inc. All Rights Reserved. Patents Pending.

Java Application Window

Example 5 – No Limits, No Crossing Buy/Sell Orders

VC is launched with the VC level set to the average of the best buy and sell limit (bid and offer). In this example, the best buy and sell limits are 34 and 34.5bps, and hence VC is launched at 34.25bps. If we end up choosing the notional weight the calculated mid, this example would give us a VC level of 34.16bps.

Submissions

| Bank | Bid | | Offer | | Time |
|---|---|---|---|---|---|
| | Size (mm) | Price | Price | Size (mm) | |
| Bank 1 | 1000 | 34 | | | |
| Bank 2 | | | 34.5 | 500 | |
| Bank 3 | | | | | |
| Bank 4 | | | | | |
| Bank 5 | | | | | |
| Bank 6 | | | | | |
| Bank 7 | | | | | |
| Bank 8 | | | | | |
| Bank 9 | | | | | |
| Bank 10 | | | | | |

Note that the time is not used here – limit ordering MUST take account of time with earlier orders at same limit being "better"

Auction Result

| Auction Price | N/A | (Determined from maximum executable volume) |
|---|---|---|
| Suggested Mid Price | 34.25 | |

Trades Resulting From Auction at Auction Price

| Buyer | Seller | Size |
|---|---|---|

Unfilled Orders at Auction Price or Better (to go into VC automatically at auction level)

| Bank | Size |
|---|---|

Unfilled Orders at Limit Worse Than Auction Price (they get VC invite but orders NOT placed into VC automatically)

| Bank | Size |
|---|---|
| Bank 1 | 1000 |
| Bank 2 | 500 |

Order Book During Price Determination Phase

| | Bid Orders | | | | | | Offer Orders | | | |
|---|---|---|---|---|---|---|---|---|---|---|
| Banks at this Limit | Size | Cumulative Size | Surplus Demand | Buyer Fill (* means no trade & best bid) | Limit | Tradable Size @ Limit | Seller Fill (* means no trade & best offer) | Surplus Supply | Cumulative Size | Size | Banks at this Limit |
| | | | | | 34.5 | 0 | | 500 | 500 | 500 | Bank 2 |
| | | | | * | 34* | 0 | | 0 | 0 | 1000 | |
| Bank 1 | 1000 | 1000 | 0 | | | | | | | | |

Key

| /// | Complete fill |
|---|---|
| \\\ | Partial fill |
| //// | No Trading – Best bid/offer |
| ///// | Trade level (fix) |

FIG. 24

Example 6 – No Limits, One Sided Order Book

In this case there is no auction price set AND no VC launched.

Submissions

| Bank | Size (mm) | Price | Price | Size (mm) | Time |
|---|---|---|---|---|---|
| | | Bid | Offer | | |
| Bank 1 | 1000 | 34 | | | |
| Bank 2 | 500 | 34.5 | | | |
| Bank 3 | 750 | 33 | | | |
| Bank 4 | | | | | |
| Bank 5 | | | | | |
| Bank 6 | | | | | |
| Bank 7 | | | | | |
| Bank 8 | | | | | |
| Bank 9 | | | | | |
| Bank 10 | | | | | |

Note that the time is not used here – limit ordering MUST take account of time with earlier orders at same limit being "better".

Auction Result

| Auction Price | N/A | (Determined from maximum executable volume) |
|---|---|---|
| Suggested Mid Price | N/A | |

Trades Resulting From Auction at Auction Price

| Buyer | Seller | Size |
|---|---|---|

| Unfilled Orders at Auction Price or Better (To go into VC automatically at auction level) | | |
|---|---|---|
| Bank | Size | |

| Unfilled Orders at Limit Worse Than Auction Price (they get VC invite but orders NOT placed into VC automatically) | | |
|---|---|---|
| Bank | Size | |
| Bank 1 | 1000 | |
| Bank 2 | 500 | |
| Bank 3 | 750 | |

Order Book During Price Determination Phase

| | Bid Orders | | | | | | | Offer Orders | | |
|---|---|---|---|---|---|---|---|---|---|---|
| Banks at this Limit | Size | Cumulative Size | Surplus Demand | Buyer Fill (* means no trade & best bid) | Limit | Tradable Size @ Limit | Seller Fill (* means no trade & best offer) | Surplus Supply | Cumulative Size | Size | Banks at this Limit |
| Bank 2 | 500 | 500 | 500 | * | 34.5 | 0 | | 0 | 0 | | |
| Bank 1 | 1000 | 1500 | 1500 | | 34 | 0 | | 0 | 0 | | |
| Bank 3 | 750 | 2250 | 2250 | | 33 | 0 | | 0 | 0 | | |

Key:
- ///// Complete fill
- \\\\\ Partial fill
- ///// No Trading – Best bid/offer
- ///// Trade level (fix)

FIG. 25

SUBMISSIONS

| BANK | BID | | OFFER | | TIME |
|---|---|---|---|---|---|
| | SIZE (mm) | PRICE | PRICE | SIZE (mm) | |
| BANK 1 | 50 | 64 | | | |
| BANK 2 | 25 | 60 | | | |
| BANK 3 | 50 | 30 | | | |
| BANK 4 | | | 67 | 50 | |
| BANK 5 | | | 64 | 50 | |
| BANK 6 | | | 40 | 50 | |
| BANK 7 | | | | | |
| BANK 8 | | | | | |
| BANK 9 | | | | | |
| BANK 10 | | | | | |

FIG. 26A

ORDER BOOK DURING PRICE DETERMINATION PHASE

| BID ORDERS | | | | | | | | OFFER ORDERS | | | |
|---|---|---|---|---|---|---|---|---|---|---|---|
| BANKS AT THIS LIMIT | SIZE | CUMULATIVE SIZE | SURPLUS DEMAND | BUYER FILL (* MEANS NO TRADE & BEST BID) | LIMIT | TRADABLE SIZE @ LIMIT | SELLER FILL (* MEANS NO TRADE & BEST OFFER) | SURPLUS SUPPLY | CUMULATIVE SIZE | SIZE | BANKS AT THIS LIMIT |
| | | 0 | 0 | | 67 | 0 | | *50 | 150 | 50 | BANK 4 |
| BANK 1 | 50 | 50 | 0 | 50 | 64 * | 50 | | 50 | 100 | 50 | BANK 5 |
| BANK 2 | 25 | 75 | 25 | | 60 * | 50 | | 0 | 50 | | |
| | | 75 | 25 | | 40 * | 50 | 50 | 0 | 50 | 50 | BANK 6 |
| BANK 3 | 50 | 125 | 125 | | 30 | 0 | | 0 | 0 | | |

FIG. 26B

AUCTION RESULT

| AUCTION PRICE | 60 | (DETERMINED FROM MAXIMUM EXECUTABLE VOLUME) |
|---|---|---|
| SUGGESTED MID PRICE | N A | |

TRADES RESULTING FROM AUCTION AT AUCTION PRICE

| BUYER | SELLER | SIZE |
|---|---|---|
| | | |
| | | |
| | | |
| | | |
| | | |
| | | |
| | | |

UNFILLED ORDERS AT AUCTION PRICE OR BETTER (TO GO INTO VC AUTOMATICALLY AT AUCTION LEVEL)

| BANK | SIZE |
|---|---|
| BANK 1 | 50 |
| BANK 2 | 25 |
| BANK 6 | 50 |
| | |
| | |
| | |
| | |

UNFILLED ORDERS AT LIMIT WORSE THAN AUCTION PRICE (THEY GET VC INVITE BUT ORDERS NOT PLACED INTO VC AUTOMATICALLY)

| BANK | SIZE |
|---|---|
| BANK 3 | 50 |
| BANK 4 | 50 |
| BANK 5 | 50 |
| | |
| | |
| | |
| | |

FIG. 26C

SYSTEMS AND METHODS FOR MARKET ORDER VOLUME CLEARING IN ONLINE TRADING OF CREDIT DERIVATIVES

CROSS REFERENCE TO RELATED APPLICATIONS

This patent application is a divisional of U.S. patent application Ser. No. 12/197,395 filed Aug. 25, 2008, which claims priority to U.S. Provisional Application No. 60/988,009, filed Nov. 14, 2007, and U.S. Provisional Application No. 60/957,823, filed Aug. 24, 2007, and is also a continuation-in part of U.S. patent application Ser. No. 10/954,629, filed Sep. 29, 2004, U.S. patent application Ser. No. 10/957,217, filed Oct. 1, 2004, and U.S. patent application Ser. No. 11/837,159, filed Aug. 10, 2007, which are continuation-in-part applications of U.S. patent application Ser. No. 10/316,167, filed Dec. 9, 2002.

Each of the aforementioned related applications is hereby incorporated by reference herein in its entirety.

FIELD OF THE INVENTION

Embodiments of the present invention relate generally to online trading of financial instruments. More specifically, the present invention relates to systems and methods for volume clearing during online trading of credit derivatives.

BACKGROUND OF THE INVENTION

The related applications have disclosed an online trading system that brings significant improvements over the inefficient dealer-broker paradigm of convention credit derivative market. With an electronic trading platform and a suite of online and offline features, a large number of dealers or trading clients may trade credit derivatives in a streamlined fashion, that is, without the prior limitations of regionalized markets, lack of standardized documentation, slow dissemination of pricing information.

On a high enough level, electronic trading of credit derivatives is similar to electronic trading of stocks or other exchange-traded financial instruments in that a central computer or electronic system typically facilitates trades among remotely situated traders. However, the similarity does not go much beyond that.

Credit derivatives, such as credit default products, are typically over-the-counter (OTC) contracts negotiated and entered into by dealers on behalf of relatively large institutions. For example, a credit derivative by definition must reference a third party upon whose creditworthiness the price and value of the credit derivative is based. Therefore, before it can be traded electronically, each credit derivative position must be defined in much greater detail than public stocks. Credit derivatives are also fairly illiquid, unlike public stocks which are more like fungible commodities.

The credit derivative market is also unique in many different ways. Traditionally, the credit derivative market has not been as well organized or regulated as stock exchanges or bond markets. The user base (or the number of potential counterparties) of credit derivative market is much smaller than that of public stocks. There is a need to increase the number of trades of credit derivatives. At the same time, there has been concerns that large trades or even a perceived desire for large trades may artificially influence pricing levels in the relatively small credit derivative market.

In view of the foregoing, it may be understood that there are significant problems and shortcomings associated with current credit derivative trading techniques.

SUMMARY OF THE INVENTION

Systems and methods for volume clearing during online trading of credit derivatives are disclosed. In one particular exemplary embodiment, a computer-implemented method for volume clearing in an online trading system of credit derivatives may comprise: selecting, from a plurality of credit derivatives, at least one most liquid credit derivative that has either been traded or seen trading interest in the online trading system during a predetermined time period; determining a volume clearing price level for the at least one most liquid credit derivative based on: an availability of a last bid, a last offer, or a last trade associated with the at least one most liquid credit derivative, a timing relationship among the last bid, the last offer, and the last trade, if available, and price levels of the last bid, the last offer, and the last trade, if available; inviting trading clients of the electronic trading system to submit, within a lime limit, buy orders and sell orders for the at least one most liquid credit derivative at the volume clearing price level, each buy order or sell order specifying a desired volume; matching the buy orders and the sell orders submitted within the time limit to maximize a total notional amount of the at least one most liquid credit derivative that can be traded at the volume clearing price level; and completing trades at the volume clearing price level, according to the matching of the buy orders and the sell orders.

In another particular exemplary embodiment, an electronic trading system of credit derivatives may comprise: a processor; at least one storage device coupled to the processor; a user interface coupled to the processor via one or more communication networks; wherein the processor is adapted to communicate with the at least one storage device and the user interface to execute instructions to perform the following tasks: selecting, from a plurality of credit derivatives, at least one most liquid credit derivative that has either been traded or seen trading interest in the electronic trading system during a predetermined time period; determining a volume clearing price level for the at least one most liquid credit derivative based on: an availability of a last bid, a last offer, or a last trade associated with the at least one most liquid credit derivative, a timing relationship among the last bid, the last offer, and the last trade, if available, and price levels of the last bid, the last offer, and the last trade, if available; inviting trading clients of the electronic trading system to submit, within a lime limit, buy orders and sell orders for the at least one most liquid credit derivative at the volume clearing price level, each buy order or sell order specifying a desired volume; matching the buy orders and the sell orders submitted within the lime limit to maximize a total notional amount of the at least one most liquid credit derivative that can be traded at the volume clearing price level; and completing trades at the volume clearing price level according to the matching of the buy orders and the sell orders.

The present invention will now be described in more detail with reference to exemplary embodiments thereof as shown in the accompanying drawings. While the present invention is described below with reference to exemplary embodiments, it should be understood that the present invention is not limited thereto. Those of ordinary skill in the art having access to the teachings herein will recognize additional implementations, modifications, and embodiments, as well as other fields of use, which are within the scope of the present invention as described herein, and with respect to which the present invention may be of significant utility.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

FIG. 6 is a chart that illustrates one example of the matching of orders received in a volume clearing session.

FIG. 9A is an exemplary screen shot illustrating how a participant may be solicited for bids and offers in accordance with one embodiment of the present invention.

FIG. 9B is an exemplary screen shot illustrating how a participant may perform volume clearing in accordance with one embodiment of the present invention.

FIG. 9C is an exemplary screen shot illustrating the results of a volume clearing session in accordance with one embodiment of the present invention.

FIG. 11A shows a table listing exemplary price scenarios and the resultant volume clearing price levels in accordance with one embodiment of the present invention.

FIG. 11B shows a table presenting exemplary trading data related to real market order volume clearing sessions.

FIG. 13 is a screen shot showing an exemplary market order volume clearing control window in accordance with one embodiment of the present invention.

FIG. 14 is a screen shot showing an exemplary display of Top-5 single names in accordance with one embodiment of the present invention.

FIG. 15 is a screen shot showing an exemplary volume clearing window a trade client may see during a market order volume clearing session in accordance with one embodiment of the present invention.

FIG. 18 is a screen shot showing an exemplary volume clearing window a trade client may see during the order submission phase of a limit order volume clearing session.

FIG. 19 is a screen shot showing an exemplary volume clearing window a trade client may sec during the volume clearing phase of a limit order volume clearing session.

FIGS. 20-25 show numerical examples of six scenarios referenced in the exemplary decision tree of FIG. 17.

FIGS. 26A-C show a numerical example for determining an auction price in accordance with one embodiment of the present invention.

DETAILED DESCRIPTION OF THE INVENTION

Embodiments of the present invention provide for an online trading system for financial instruments and particular functionalities for electronic trading of credit derivatives. Preferred embodiments of the present invention further facilitate creative trading techniques such as volume upsizing, volume clearing based on recent trades, volume clearing based on tradable credit spread fixings, market order volume clearing, and limit order volume clearing.

Credit Derivative Trading System

Figure 1:
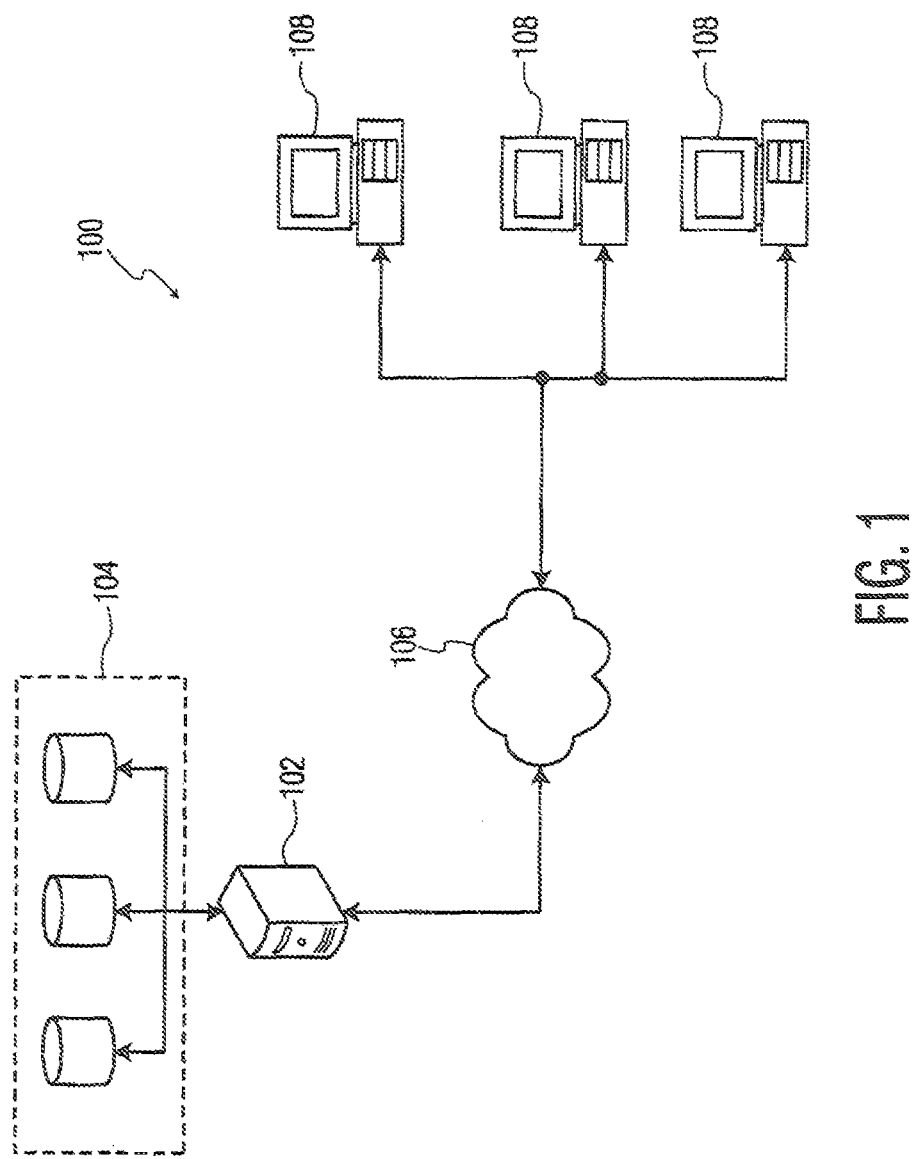
FIG. 1 is a diagram illustrating an exemplary credit derivative trading system in accordance with one embodiment of the present invention.

FIG. 1 is a diagram illustrating an example credit derivative trading system 100 in accordance with one embodiment of the systems and methods described herein. System 100 may comprise a credit derivative authority 102 interfaced with a database 104. Database 104 may, as illustrated, actually comprise one or more databases depending on the embodiment. The credit derivative authority 102 may also be interfaced with a plurality of trader clients via terminals 108 through a network 106.

In one embodiment, the network 106 may be the Internet, although the network 106 may be any type of wired or wireless Wide Area Network (WAN), wired or wireless Local Area Network (LAN), or even a wired or wireless Personal Area Network, or some combination thereof. In certain embodiments, the credit derivative authority 102 and/or the terminals 108 may be interfaced with the network 106 via wired and/or wireless communication links.

In one embodiment, the terminals 108 are computer terminals, such as desktop or laptop computers. In other embodiments, terminals 108 are handheld devices, such as handheld computers or personal digital assistants (PDAs). It will be apparent, however, that terminals 108 can be any type of terminal configured to include the functionality required by the systems and methods described herein.

The term "authority" used to identify the credit derivative authority 102 is intended to indicate that the terminals 108 communicate with the credit derivative authority 102 through the computing systems, hardware and software, associated with the credit derivative authority 102. Depending on the embodiment the term "authority" may refer to one or more servers, such as Internet or web servers, file servers, and/or database servers, one or more routers, one or more databases, one or more software applications, one or more Application Program Interfaces (APIs), or some combination thereof.

Further, the computing system associated with the credit derivative authority 102 may include one or more computers or computer terminals. To that extent, some of the same components that comprise the computer system associated with the credit derivative authority 102 can also include the terminals 108.

System 100 may include a standardize interface that allows trader clients to define positions with the credit derivative authority 102 for any of a plurality of credit derivatives regardless of the region, industry, etc. The credit derivative authority 102 is configured to then store the positions in the database 104. Using the standardized interface, the credit derivative authority 102 may display information related to the positions stored in the database 104 to the trader clients via the terminals 108. The trader clients are then able to define responsive positions, indicate a willingness to transact, and/or complete a transaction through the standardized interface. Thus, the credit derivative authority 102 can replace the dealer-broker paradigm of conventional credit derivative markets and provides the trader clients with more outlets, greater liquidity, and more efficiency, all of which can help lower transactional costs.

The standardized interface may comprise software components configured to run on or to interoperate with the credit derivative authority 102 as well as client software components configured to run on the terminals 108. Thus, the credit derivative authority 102 can work in conjunction with the client software running on the terminals 108 to format and display information to the trader clients in a uniform manner and to receive input from the trader clients through terminals 108 in a manner that allows quick, easy, and efficient transactions. Certain features and aspects of the standardized interface are discussed more fully below.

Figure 2:
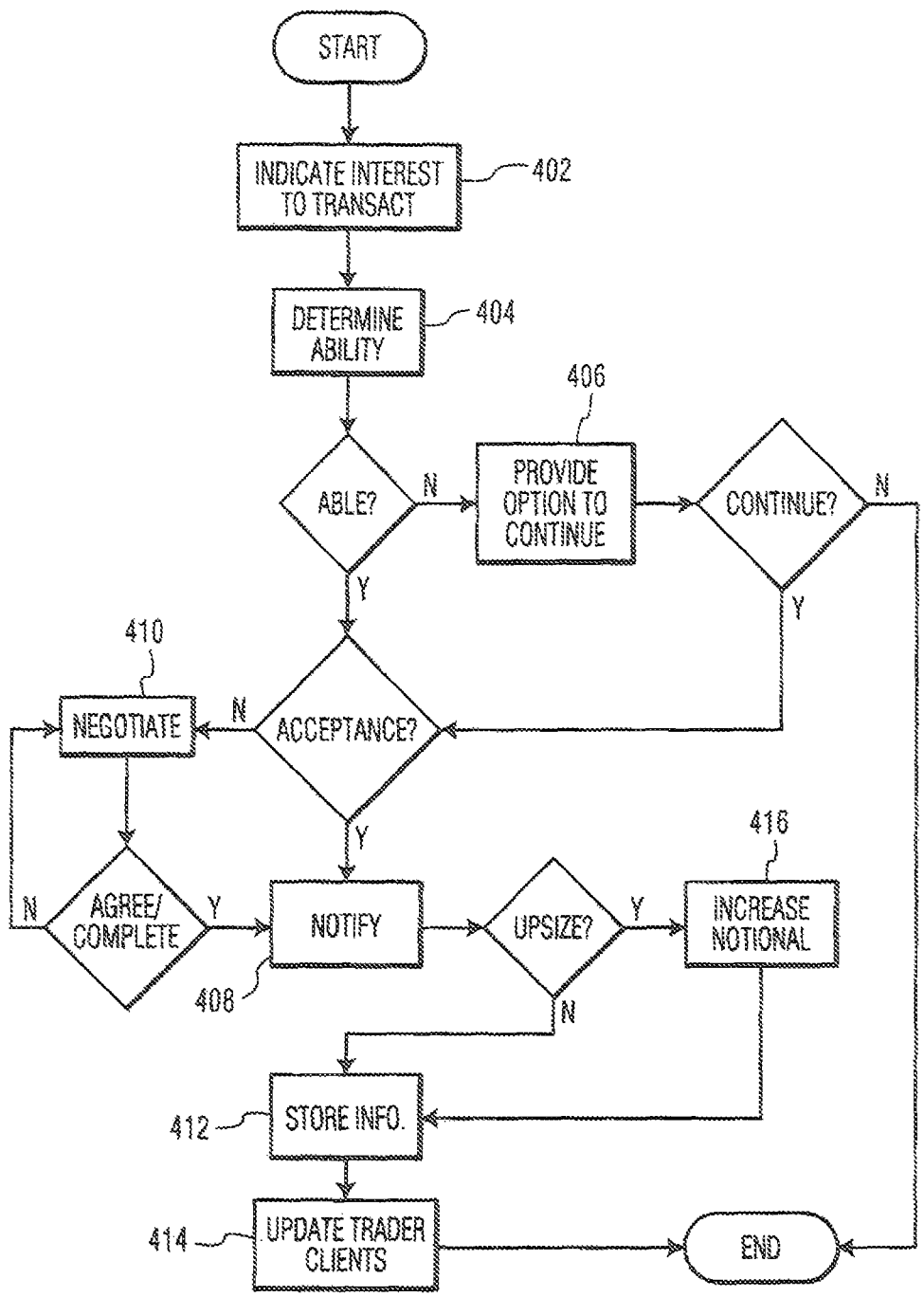
FIG. 2 is a flow chart illustrating an exemplary method of facilitating a transaction within the system of FIG. 1 in accordance with one embodiment of the present invention.

FIG. 2 is a flow chart illustrating an exemplary process for facilitating a transaction within System 100 or a similar online trading system. The process begins in step 402 with a trader client indicating a desire to transact, for example, in response to an updated position received from the system 100. For instance, the trader client may use its standardized interface to indicate a desire to transact. In one embodiment, when the credit derivative authority 102 receives the indication, it may determine the ability of the trader client to transact on the associated credit derivative. Thus, in step 404, the credit derivative authority 102 determines, based on information stored in the database 104, whether the trader client indicating a desire to transact is acceptable to the other party.

Since the credit derivative market is a bilateral market, certain trader clients may not wish to deal with certain other trader clients in all, or some, situations. Thus, in certain embodiments, the credit derivative authority 102 may be configured to receive information identifying traders with whom the trader client defining a new position is willing or unwilling to transact. That is, the trader client may provide identifying information to the credit derivative authority 102 that includes and/or excludes certain traders as potential counterparties. Depending on the embodiment, the identifying information may include the names of certain trader clients or define characteristics of acceptable (or unacceptable) trader clients.

In one embodiment, if the credit derivative authority determines that the trader client is not acceptable to the other party, then, in step 406, the credit derivative authority 102 may present the other party with the option to proceed. If the other party declines, then the transaction is not consummated. If, on the other hand, the other party is willing to continue, or if it is otherwise determined in step 404 that the trader client is able to transact, then the transaction may proceed.

The trader client may indicate a willingness to transact in step 402 by indicating a willingness to accept the terms associated with the new position or by indicating a willingness to negotiate with the other party. If the indication in step 402 is an acceptance, then the other party may be notified, in step 408, of the acceptance by the credit derivative authority 102. If the indication in step 402 is of a willingness to negotiate, then the parties may negotiate with each other in step 410. As will be described in more detail below, the negotiation is preferably aided by the standardized interface and the credit derivative authority 102 of System 100. In an alternative embodiment, once the trader client indicates a willingness to transact in step 402, the trader client may call, or may be contacted by, a broker associated with the credit derivative authority 102 to negotiate and reach an agreement on the transaction. In certain embodiments, direct negotiation as just described is not supported.

Once an agreement is reached regarding the transaction, the trade may be deemed completed. Then, in step 412, all of the information associated with the transaction may be stored by the credit derivative authority 102 into the database 104 in real-time or substantial real-time. That is, the information may be stored while it passes back and forth between the parties and between the parties and credit derivative authority 102. The credit derivative authority 102 may then update the information displayed to the trader clients, again in substantial real-time, in step 414, based on the transaction information.

Volume Upsizing

In another embodiment, upon the settlement or completion of the transaction, the credit derivative authority 102 may prompt the trader client and/or the other party whether they desire to upsize the trade, that is, to increase the notional amount of the trade just completed. At this point, both parties to the trade may be given a chance to request a trade of a larger notional amount, before knowing who their trading partner is. Upon determination of the largest notional amount agreed upon by both parties (anonymously), the notional amount of the trade may be accordingly increased in step 416, and the trade may be completed at this increased (or "upsized") notional amount.

The volume upsizing option may be beneficial when a trader client desires to trade a notional amount that is greater than the standard or default amount. Generally, traders are hesitant to make an intention to trade more than the standard or default amount known, because this can result in a lower price for the credit derivative or otherwise skew the pricing thereof. Thus, if a default trade amount is 10 million shares and a trader desires to trade 30 million shares, the trader will often simply attempt to make three trades. With the volume upsizing process described herein, a trader desiring to trade a large notional amount of a credit derivative can trade that notional amount without making the market aware of his intention, thereby maintaining the value of his credit derivative.

Figure 3:
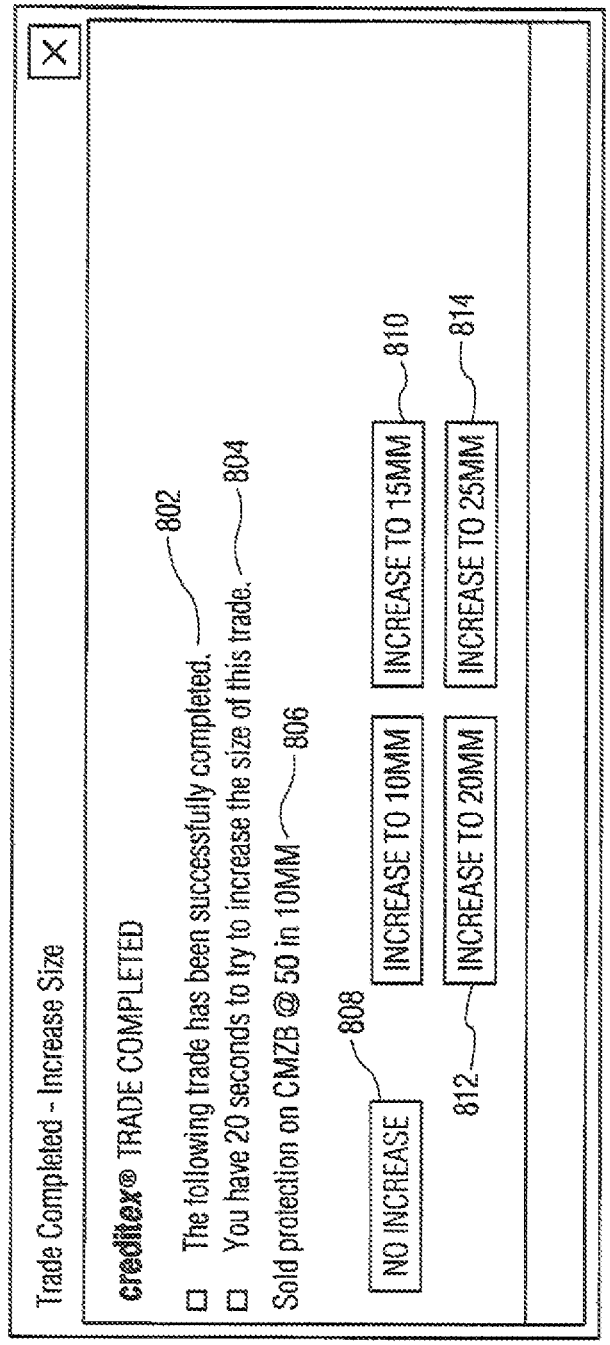
FIG. 3 is a screen shot illustrating an example method of displaying a request to upsize a trade in accordance with one embodiment of the present invention.

FIG. 3 is a screen shot illustrating an exemplary method of displaying a request upsize a trade in accordance with an embodiment of the present invention. Field 802 indicates that the original trade is completed in the notional amount shown in Field 806. In this particular embodiment, the trader client is given a predetermined amount of time to respond to the upsize prompt, which is 20 seconds as shown in Field 804. The trader client may then elect to increase the trade to a higher notional amount by activating Buttons 810, 812, or 814 depending on the desired size of the increase, or the trader client may indicate no desire to increase by activating Button 808. If both parties agree, the trade may be upsized to the notional amount selected. In another embodiment, the upsize prompt may repeal until one of the two trading parties no longer wishes to upsize, at which point the largest amount agreed upon by both parties can be traded. In yet another embodiment, if the two parties both choose to upsize but not to the same notional amount, the smaller of the two notional amounts selected may be taken as the agreed-upon notional amount.

Volume Clearing Based on Recent Trade(s)

While the volume upsizing option has been described thus far as being limited to counterparties of a completed trade, such limitation may be relaxed or removed. Through a process generally referred to as "volume clearing," an online trading system may cause a plurality of trader clients to anonymously trade a financial instrument (e.g. credit derivative) at a predetermined price level and within a defined time window.

For example, when there is sufficient activity in a particular credit derivative as determined either by the trading system or by the participants, the trading system may facilitate a volume clearing of that credit derivative based on its most recently traded price. In overview, once the credit derivative has been traded, trader clients (including but not limited to the original counterparties in the completed trade) may be invited to make bids and/or offers on that credit derivative during a set time interval. Those who desire to participate indicate the notional amount they desire to buy or sell. Once the time limit expires, the trading system determines which participants can trade and which buyers actually trade with which sellers, by matching similar trade amounts.

Figure 4:
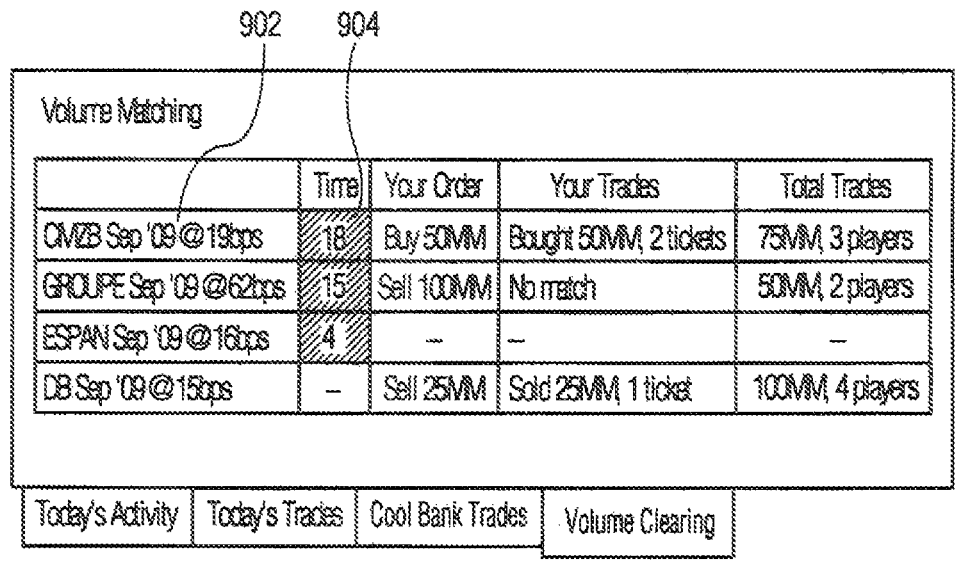
FIG. 4 is a screenshot illustrating an exemplary method for displaying trade information that includes an option for volume clearing in accordance with one embodiment of the present invention.

More specifically, when a trade is completed, the price can be offered to invited participants by listing the trade in a "Volume Clearing" display. FIG. 4 is a screen shot of an example of a Volume Clearing display showing credit derivatives that a participant can trade. Column 902 represents credit derivatives that are available to be traded and the corresponding prices. Column 904 shows the time remaining to trade that particular credit derivative at that price level. For example, in the first row, the credit derivative Commerzbank (CMZB) is available for trading at a price of 19 basis points (bps) for the next 18 seconds. Participants are invited based on criteria which is indicative of their desire to trade that credit derivative, such as placement of a bid in the current trade session or placement of a bid in a recent trade session involving the trade derivative.

Figure 5:
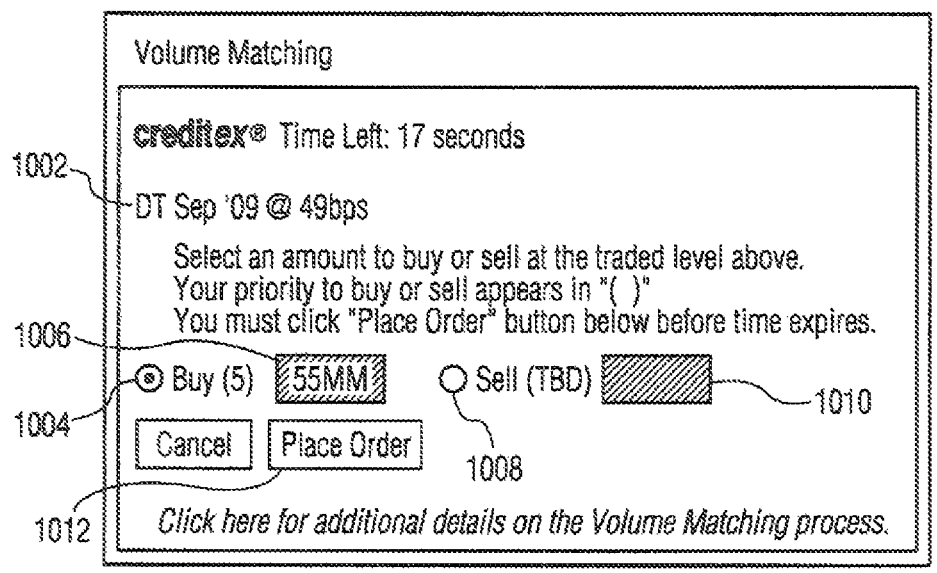
FIG. 5 is an exemplary screen shot of a display that can be used to implement volume clearing in accordance with one embodiment of the present invention.

FIG. 5 is an exemplary screenshot to illustrate a method by which an interested participant can participate in volume clearing. Field 1002 shows the credit derivative and the price it is being traded at. The participant can select Button 1004 and enter a notional amount into Field 1006 that he desires to buy the credit derivative, or, alternatively, the participant can select Button 1008 and enter a notional amount into Field 1010 that he desires to sell. The order is then placed by clicking on Field 1012. The volume clearing or volume matching window shown in FIG. 5 may be a pop-out window that only appear for a predetermined time period and may display a count-down clock to remind the user how much time is left to place an order. Alternatively, the volume matching window may be a part of a larger spreadsheet or trading screen that can be highlighted, flashing, displaying other visual alerts, or generating audio alerts during an ongoing volume clearing session.

After the set time interval has expired, the orders can be filled according to the priority of the participant. The participant can be assigned a priority in the following order: (a) the highest priority goes to participants in the recent trade whose trading price has been adopted for the volume clearing session: (b) the next highest priority goes to participants who are in the buyer or seller priority queues at the time of that recent trade: and (3) finally, the remaining participants are prioritized on a first come first serve basis.

The orders are then matched to optimize as much as possible orders of the same size of the counterparties. By doing so, the number of trade tickets generated is minimized. Once the matching is completed a trade ticket is generated and each transaction can be completed similar to the manner described above for a single trade.

FIG. 6 is a table showing an example of how trade matching works in a volume clearing session. In table 1102, there are shown four buyers and three sellers with their respective orders listed in the order of their priority. In matching table 1104, Buyer 1 is matched with Seller 3 because their notional amounts match. Furthermore, Buyer 2 is matched with Seller 1 because their notional amounts match. Since the remaining orders do not match exactly, the orders can be split. Buyer 3 having priority over Buyer 4 is matched first with Seller 2. Since Seller 2's order is larger than Buyer 3's order, the remaining notional amount of Seller 2's order is available to Buyer 4.

Another method of assigning priority to traders during a volume clearing session is to assign the highest priority to the original buyer and original seller, to assign the next highest priority to the original buyer and original seller if they change sides (e.g., I bought on the original trade that caused a volume clearing to occur, and I now wish to sell during the volume clearing session), and to assign the next highest priority based on the rankings of the participants price support and/or depth.

Price support can be calculated as follows. (1) fake the sum of all valid price support hours for each participant, for example, in the last 30 trading days. Valid price support hours is the number of hours for which prices are displayed on the electronic trading platform. Prices are considered valid if a bid is within a pre-determined threshold of the best offer of the day, and if an offer is within a pre-determined threshold of the best bid of the day. (2) Rank all participants from best to worst. (3) Assign numerical scores to the ranked participants, for example, score the best as 1, second best as 2, and continue until all participants have been assigned a score.

Depth is an indication of whether a participant had a price in the original buyer or seller's priority queues during the original (recent) trade as well as the participant's position in the queue(s). For example, if the credit derivative traded at 20 bps prior to the volume clearing session, and the participant was in the queue with the next-best bid of 19 bps, the participant may be given an appropriate priority in the volume clearing based on his position in the queue.

A priority can be based on either price support ranking or depth ranking. Alternatively, a priority can be based on both price support and depth rankings, for example, 50% on price support and 50% on depth.

Priority can also be assigned according to yet another methodology, which benefits participants that may trade a lot but may not get credit for as much price support under the previously described mythology. According to this methodology, the highest priority goes to the original buyer and original seller, the next highest priority is assigned to the original buyer and original seller if they change sides during the volume clearing, the next priority is then assigned based on the participants ranking based on the rankings of the participants' notional amount and/or price support.

The ranking of notional amount can be calculated by summing the number of trades of a standard size in a given sector for the last 30 calendar days. More specifically, the calculation can be based on the number of "clips" of market standard size that have been traded. Market standard size is defined by the system and is the most common size that people will post prices onto the trading platform.

Examples of standard market sizes may include for example:

| | |
|---|---|
| iTraxx Europe & HiVol | EUR 25 MM |
| iTraxx Crossover | EUR 10 MM |
| European Financials | EUR 10 MM |
| European Single Names | EUR 5 MM |

For example, if a participant trades 500 MM iTraxx Europe and 80 MM iTraxx Crossover in the last 30 days, both trades would count towards the ranking for European Indices for volume clearing purposes. However, the data may be normalized before being counted (otherwise there is an incentive advantage towards trading iTraxx Europe instead of iTraxx Crossover as far as the ranking calculation is concerned). The notional amount of each trade may preferably be divided by the corresponding standard market size. For Example: 500 MM/25 MM=20 clips of iTraxx Europe, 80 MM/10 MM=8 clips of iTraxx Crossover.

Therefore, the platform counts (20+8=28) clips of standard market size traded for this participant. This calculation may be performed for all the counterparties, and then counterparties may be ranked according to the calculated results.

According to some embodiments of the present invention, large-magnitude trades can be rewarded with a higher value counted towards the notional amount ranking than other trades. For example, any tickets that are greater than or equal to four times Market Standard Size (e.g., FUR 20 MM on European single names and EUR 100 MM on iTraxx Europe) can count double. In the previous example of trading 500 MM Europe, if a participant executed one trade of 100 MM on the trading platform during this period, the calculation may be as follows: 400 MM/25 Mis.4=16 clips of regular-sized iTraxx Europe trades, 100 MM.times.2/25 MM=8 clips of large-magnitude of iTraxx Europe trades, and 80 MM/10 MM=8 clips of iTraxx Crossover trades. Therefore the system will count 32 clips of standard market size traded for this participant.

Indices, for example European indices have many different (old) series that may not be current. iTraxx Europe, for example, has 5 series (or versions) available. Preferably, the notional ranking calculation is bifurcated into one ranking for the current series (series 5 in Europe) and another ranking across all other series (i.e., sum of notional traded across all the other four series).

The price support ranking docs not change from the previously described methodology based on price support and depth. To obtain an overall ranking, the notional and price support rankings for each participant may be averaged. The participants are then re-ranked according to the averaged rankings. Any ties can be broken by looking first at the notional ranks and then the price support ranks of participants who have the same averaged ranking. For example:

| | Notional | Price Support | Overall (averaged) |
|---|---|---|---|
| Bank A | 5 | 7 | 6 |
| Bank B | 7 | 5 | 6 |

In the above example both banks have an overall rank of 6. In the final calculation Bank A can be ranked 6 and Bank B ranked 7 because Bank A has a higher ranking in its notional amount.

Volume Clearing Based on Tradable Credit Spread Fixing

According to some embodiments of the present invention, a price may be fixed by an online trading system for a credit derivative (or other financial instrument), and then invited participants may place orders (e.g., by specifying desired volumes) to buy or sell the credit derivative at the fixed price. A volume clearing or volume matching process as described herein may be employed to match up the orders and complete the resultant transactions. There are many methods by which the trading system may fix a volume clearing price. For example, the system may solicit and accept a number of bids and offers from its participants. Each of these bids and offers may include, in addition to a bid price (if buying) or an offer price (if selling), a desired volume to be traded. In one embodiment, the bids and offers may be made binding to prevent participants from entering false bids in order to influence the market. Furthermore, to prevent participants from unduly influencing the market, a participant whose bid price is met, that is the bid price is at least that of the fixed price can be prohibited from selling during the volume clearing. Likewise, a participant whose offer price is met, that is the offer price is at most that of the fixed price can be prohibited from buying during the volume clearing. Based on these bids and offers the system can select or determine a fixed price for a volume clearing session.

Figure 7:
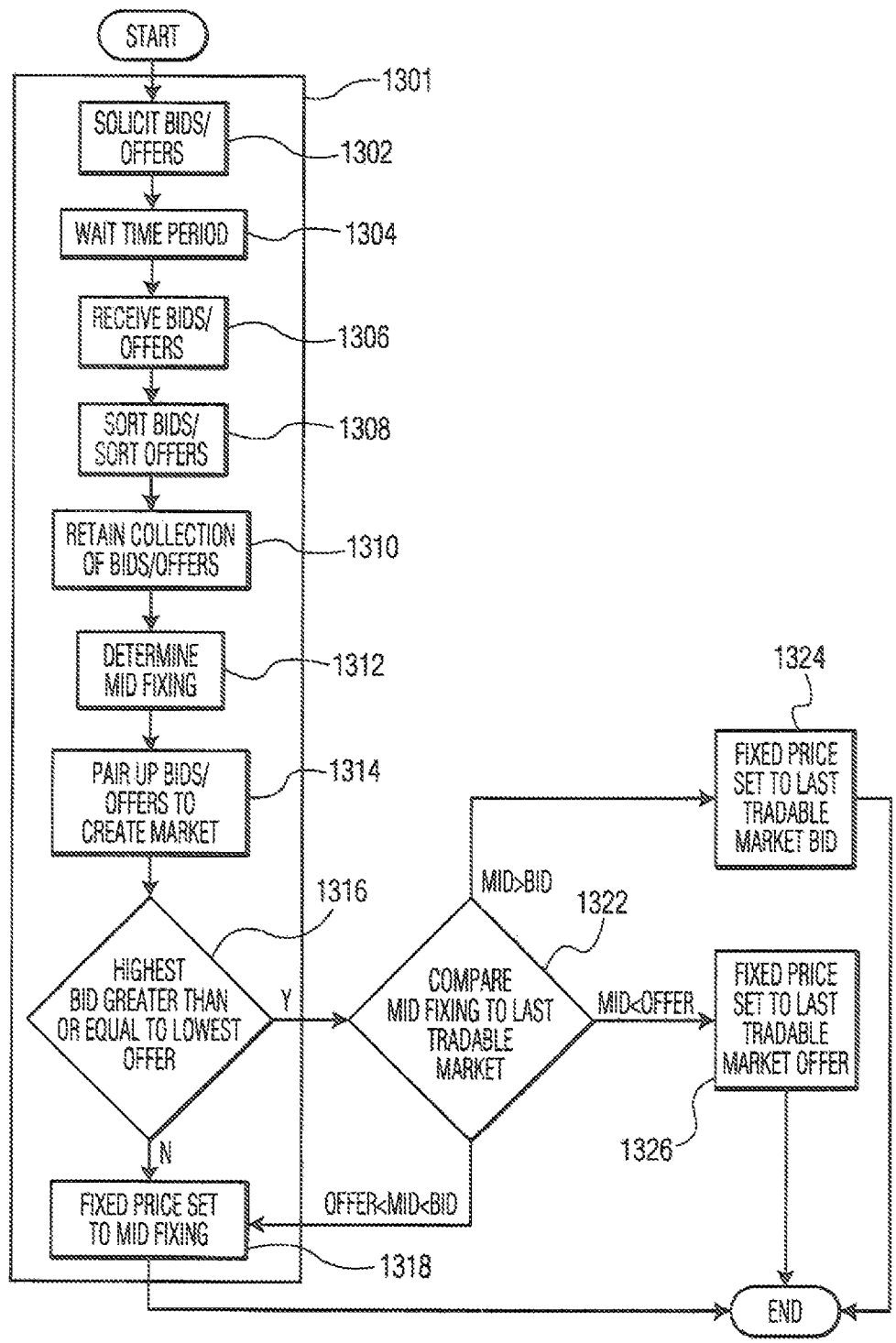
FIG. 7 is a flow chart depicting an exemplary method of determining a volume clearing price level based on bids and offers submitted by participants.

FIG. 7 is a flow chart depicting an exemplary method of determining a volume clearing price level based on bids and offers submitted by participants. In step 1302, the system solicits bids and offers from the participants. The bids and offers may be solicited from a group of trade clients, typically market-making dealers. Bach dealer may be required to submit a binding two-way market including both a bid price and an offer price. In step 1304, the system wails a predetermined period of lime. In step 1306, the system collects all valid bids and offers from the participants. In step 1308, the bids are sorted into a first sequence with the highest bids first (i.e., in descending order), and, separately, the offers are sorted into a second sequence with the lowest offers first (i.e., in ascending order). In step 1310, all bids except for a first predetermined number or portion of the highest bids and all offers except for a second predetermined number or portion of the lowest offers are discarded. For example, according to one embodiment, the lowest half of the bids and the highest half of the offers may be discarded. That is, only the highest half of the bids and the lowest half of the offers are kept. This filtering step (1310) may be helpful to exclude outlier orders and/or those orders that were intended to unduly influence to the market. In step 1312, the average is computed by averaging all the bid prices and offer prices of the remaining orders. In some embodiments where a volume is specified along with a bid and/or offer price, the average may be computed as either a simple average where each bid price and offer price is accounted for equally or as a weighted average where each bid price and offer price is averaged based on a corresponding volume specified by the participant. This average is called the mid fixing. In step 1314, a sequence of markets is created by pairing the sorted sequence of bids with the sorted sequence of offers, so that the highest bid and the lowest offer comprise a first market in the sequence, wherein each market comprises a bid and an offer. In step 1316, a determination is made as to whether the highest bid exceeds the lowest offer. If not, the volume clearing price is fixed at the average (i.e., mid fixing or "mid") in step 1318. If so, the market (i.e. pair of bid and offer) with the lowest bid and the highest offer where the bid is at least the offer is determined. This market is referred to as the "last tradable market." In step 1322, a determination is made as to whether the average (or mid) is above the bid of the last tradable market, below the offer of the last tradable market, or between the bid and the offer of the last tradable market. If the average is between the offer and the bid of the last tradable market, then the volume clearing price is fixed at the average in step 1318. If the average is above the bid of the last tradable market, then the volume clearing price is fixed at the bid price of the last tradable market in step 1324. If the average is below the offer of the last tradable market, then the volume clearing price fixed at the offer price of the last tradable market in step 1326. Steps 1324 and 1326 are used to ensure that a participant is not obligated to purchase at a price above his bid or to sell at a price below his offer. The volume clearing price fixed or determined according to the process illustrated in FIG. 7 is also known as a mid fixing price, or, in the context of credit derivative trading, a tradable credit spread fixing.

Embedded in the mid fixing methodology illustrated in FIG. 7 is a more typical or preferred embodiment (1301) involving the process branch of steps 1302 through 1318, which essentially calculates the fixed price from a plurality of bids and offers that cannot be paired up to create any tradable market. The absence of any tradable market may simply be the result of dealer submission. That is, none of the bid prices received in step 1306 crosses any of the offer prices received. Alternatively, the absence of any tradable market may be the result of discarding or executing tradable markets in connection with step 1310. That is, the first sequence of bid prices may be compared with the second sequence of offer prices to identify tradable markets where a bid price in the first sequence is equal to or greater than a corresponding offer price in the second sequence. If any pair of bid and offer prices is tradable, those two prices may be discarded or a trade may be executed matching that pair of bid and offer. This may continue until there is no longer any tradable markets (i.e., when the remaining highest bid price in the first sequence is less than the remaining lowest offer in the second sequence). Then, according to one embodiment, the lowest half of the remaining (non-tradable) bids and the highest half of the remaining (non-tradable) offers may be discarded. In other words, only the highest half of the bids and the lowest half of the offers are kept. Then, these remaining bid prices and offer prices are averaged to obtain the mid fixing price level in step 1312.

As to tradable markets in the dealers' submissions, those bids and offers may be paired up in at least two ways. For example, the bids and offers may be paired up according to step 1314 described above, such that the highest bid and the lowest offer form a first tradable market, the next highest bid and the next lowest offer form a second tradable market, so on and so forth until a bid is no longer greater than or equal to a corresponding offer. Alternatively and more preferably, the sorted sequence of offer prices in the above paired-up tradable markets may be flipped and then paired with the sorted sequence of bid prices, such that the highest bid and the highest offer form a first tradable market, the next highest bid and the next highest offer form a second tradable market, so on and so forth.

Additionally, bid fixing and offer fixing may be used in determining the fixed price. The basic bid fixing calculation is to take the average of all bids which remain after step 1310. The basic offer fixing calculation is to take the average of all offers which remain after step 1310. The basic method as illustrated in FIG. 7 can be adjusted such that, if the bid fixing calculation exceeds the mid fixing the bid fixing is set to the initial mid fixing. Likewise, if the offer fixing calculation is below the mid fixing, the offer fixing is set to the mid fixing.

Other methods may also be used to calculate the bid fixing.

The trades capped method takes all bids remaining after step 1310 and sets all bids greater than the mid fixing calculated in step 1312 to the mid fixing. After this, all bids are averaged to generate the bid fixing. Similarly, all offers remaining after step 1310 are taken and all offers less than the mid fixing calculated in step 1312 are set to the mid fixing. After this, all offers are averaged to generate the offer fixing.

The trades excluded method averages all bids remaining after step 1310 that are less than the mid fixing to generate the bid fixing. If no bids are below the mid fixing, the highest bid is taken as the bid fixing. Likewise, all offers remaining after step 1310 that are greater than the mid fixing are averaged to generate the offer fixing. If no offers are greater than the mid fixing, the lowest offer is taken as the offer fixing.

In the examples shown, the mid fixing is used as the fixed price for the volume clearing. In addition, the bid fixing and offer fixing can be used as a reference in future contracts as well as incorporated into the calculation of the mid fixing price in a current or future volume clearing sessions.

Figure 8:
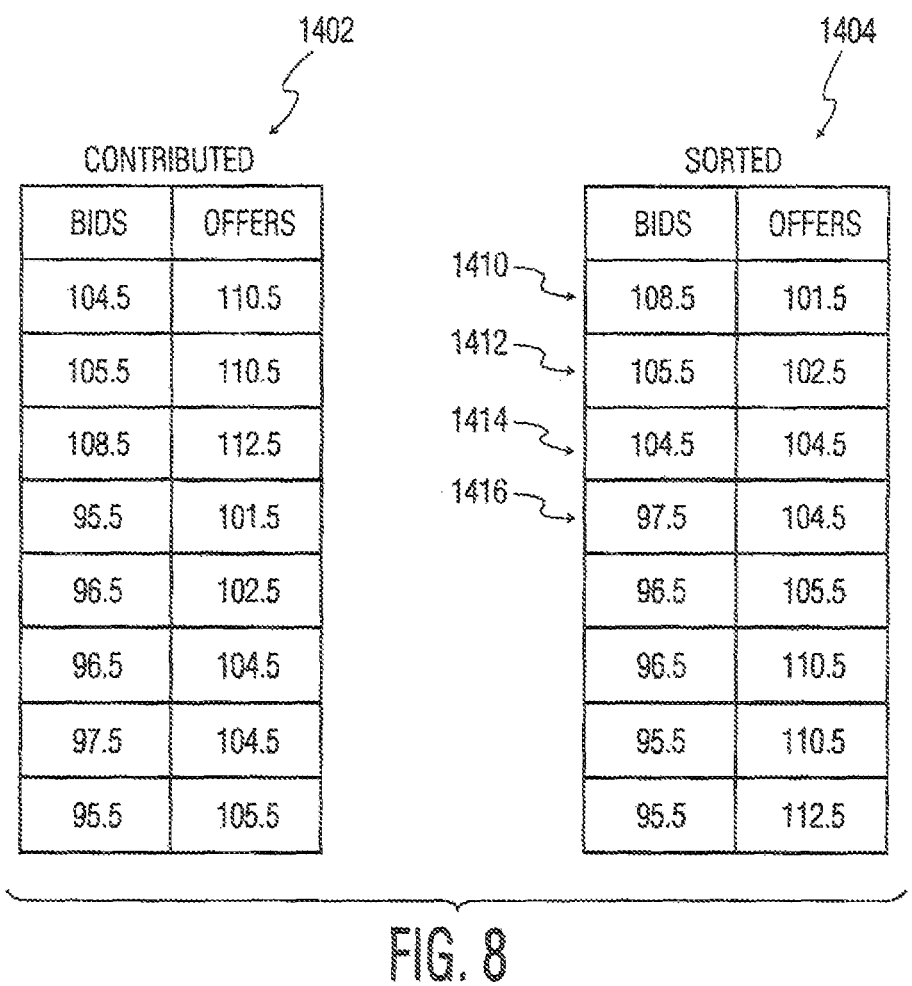
FIG. 8 shows two tables illustrating an exemplary method of determining a volume clearing price level in accordance with one embodiment of the present invention.

FIG. 8 are two tables illustrating an exemplary method of determining a volume clearing price level as described above. In Table 1402, there are shown bids and offers contributed by eight participants. In Table 1404, the contributed bids and offers are separately sorted with highest bids and lowest offers first, respectively. In accordance with step 1310, only the top half (i.e., four pairs) is kept. Thus, only rows 1410, 1412, 1414, and 1416 are kept in the mid fixing calculation. Finally, rows 1410, 1412, and 1414 show bids that are greater than or equal to the offers. Therefore, rows 1410, 1412, and 1414 represent a group of tradable markets. Row 1414 has the lowest bid and highest offer among this group, making row 1414 the last tradable market.

FIGS. 9A-9C are exemplary screen shots that a trader client participating in volume clearing related activities might see on his or her user terminal. The user terminal may be part of or may be coupled locally or remotely to an electronic trading system for credit derivatives.

FIG. 9A is an exemplary screen shot illustrating how a participant may be solicited for bids and offers. In the depicted example, when the trading system solicits bids and offers, a predetermined time limit is imposed after which bids and offers are no longer accepted. The amount of time remaining to enter a bid or offer is shown in Field 1202. In column 1204, the notional amount of a bid/offer for each credit derivative is shown. In this example, the volume (notional amount) is fixed for all participants, while in other embodiments this amount can be entered by the participant. In column 1206, bid prices may be entered by the participant for each credit derivative, and, in column 1208, offer prices may be entered. The system can also safeguard against choice prices (where a bid is equal to an offer) and inverted prices (where a bid is greater than an offer). Once the time limit for submitting orders has expired, all valid submissions by the participants are collected by the system and a fixed price is determined based on the valid submissions.

FIG. 9B is an exemplary screen shot illustrating how a participant may perform volume clearing. Once again the amount of time remaining to change or upsize orders is shown in Field 1202. Column 1210 shows a fixed price (i.e., volume clearing price) for each of the credit derivatives. If the participant's bid price is greater than or equal to the fixed price shown, the participant is required to buy at the fixed price. In this case, the participant may further specify an additional amount to buy at the fixed price by entering it into the appropriate field of column 1212. If the participant's offer price is lower than the fixed price shown, the participant is required to sell at the fixed price. In this case, the participant may further specify an additional amount to sell at the fixed price, by entering it into the appropriate field of column 1214. If the fixed price is between the participant's offer price and bid price, the participant may elect to either sell or buy an amount of credit derivative at the fixed price, but not both. Once the time limit to upsize orders has expired, all additional orders are processed by the system. The method of filling the orders is similar to that described in the volume clearing described above, except that a priority is assigned to those participants whose bids are closest to the fixed price.

FIG. 9C is a screen shot illustrating the results of a volume clearing session. Columns 1216 and 1218 show the notional amount actually traded as a result of the trading activities described above. In this example, since the participant's bid exceeded the fixed price, the participant was obligated to buy 25 MM units of iTraxx Europe. As shown, the participant also requested to buy an additional 50 MM units and successfully bought 75 MM units in total. The participant was not obligated to buy or sell iTraxx HiVol, but nevertheless requested to buy 75 MM units. However, this order was not matched by any sell order. Since the participant's offer was lower than the fixed price for iTraxx Crossover, the participant was obligated to sell 10 MM units of iTraxx Crossover. The participant also requested to sell another 40 MM units of iTraxx Crossover. Only a partial order of 20 MM units of iTraxx Crossover was available leading to a total of 30 MM units being actually traded.

Market Order Volume Clearing

According to some embodiments of the present invention, one way to increase trade volumes of an electronic trading system may be to launch one or more volume clearing sessions for one or more credit derivative products that have been most liquid during a preceding trading period. For example, at or towards the end of a trading day (or half a trading day), a number of credit derivatives that have been most actively traded or have seen the most trading interest may be selected for volume clearing. An appropriate volume clearing price level may be determined based on trade information and/or bid/offer information associated with each of the selected credit derivatives. Then, buy and sell orders may be solicited during a predetermined time limit and then matched to execute trades at the fixed volume clearing price level. When launched at the end of a trading day, this process may be referred to as "market order volume clearing" (MOVC), or also known as "end-of-day volume clearing."

Embodiments of market order volume clearing may provide trader clients a valuable opportunity to catch up with the recent market activities, get exposure to the hottest credit derivative products, and fulfill additional trading needs, all at a reasonably fixed price level and within a short period of time.

Many variations of the market order volume clearing process exist, for example, in terms of timing of the process, selection of most liquid credit derivatives, and determination of volume clearing prices, prioritization and matching of orders.

Figure 10:
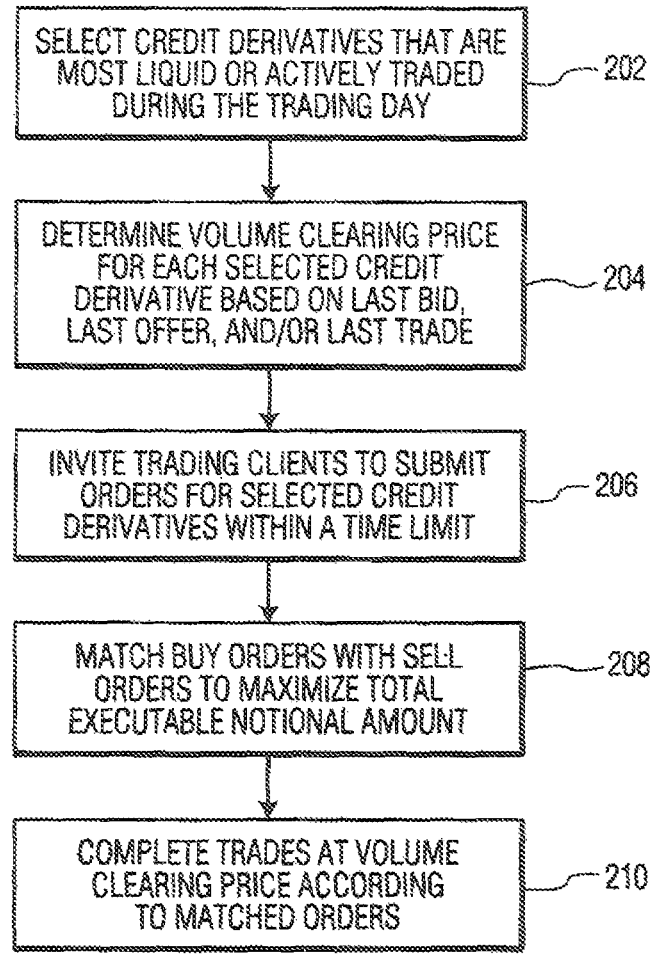
FIG. 10 is a flow chart illustrating an exemplary method for performing a market order volume clearing in accordance with one embodiment of the present invention.

FIG. 10 is a flow chart illustrating an exemplary method for performing market order volume clearing in accordance with one embodiment of the present invention.

In step 202, an electronic trading system may select one or more credit derivatives that have been most liquid or actively traded during a predetermined time period. The predetermined time period may be, for example, a trading day (market order volume clearing), a half trading day (mid-day volume clearing), one or more trading hours (end-of-hour volume clearing), or a preceding trading week (end-of-week volume clearing). That is, although the exemplary method is sometimes referred to as "end-of-day" volume clearing, the timing of volume clearing sessions may be flexibly varied, for case of explanation, the following description will take a trading day as the predetermined time period of interest.

The selection of the most liquid or actively traded credit derivatives may be conducted according to one or more preset criteria. According to embodiments of the present invention, the trading system may pick a desired trading sector first before selecting the credit derivatives for market order volume clearing purposes, for example, at the end of a trading day in London, it may be more preferable to pick European sectors for volume clearing. For a desired trading sector, the trading system may calculate a few key indicators of trading activity or trading interest for each credit derivatives available in that sector.

According to one embodiment, the key indicators may include: (i) total traded notional amount; (ii) total number of trades; and (iii) total notional amount of orders received (orders not necessarily filled), all of which are calculated for the trading day that is about to end. Preferably, the three key indicators may be used in the order listed above to evaluate and rank the amount of trading activity of or interest in a set of credit derivatives. For example, the credit derivatives in a desired sector may be first sorted in descending order of their respective total traded notional amount. If two credit derivates happen to have the same traded notional amount, the second indicator—total number of trades—will come in to break the tie. The one credit derivative with a greater number of trades is ranked ahead of the other one. The third indicator—total notional amount of orders received—may provide a further tie-breaking criterion and can facilitate the picking of credit derivatives on days when trading is thin or nonexistent but there has been active trading interest. According to an alternative embodiment, the indicators (i) and (ii) may be combined to calculate a single quantity, i.e., the average traded notional amount, for each credit.

The pool from which the most liquid credit derivatives are selected may cover not only those traded regularly online in the electronic trading system but also those traded over the telephone (i.e. voice trades) and those traded in previous volume clearing sessions. According to one embodiment, all European corporate single-name CDS's may be included in the pool, and top live of the single names may be selected for market order volume clearing.

In step 204, a volume clearing price level may be determined for each selected credit derivative based on its trading and order information during the trading day. The price determination may follow two basic principles: (a) trade prices contain more information and therefore are more relevant than bid/offer prices; and (b) the more recent the pricing information (e.g. trade, bid/offer) the more relevant it is to the price determination.

According to some embodiments, for each selected credit derivative, the price determination may be accomplished by through a decision tress that examines the following factors: an availability of a last bid, a last offer, or a last trade associated with the selected credit derivative; a timing relationship among the last bid, the last offer, and the last trade, if available; and price levels of the last bid, the last offer, and the last trade, if available.

Figure 11:
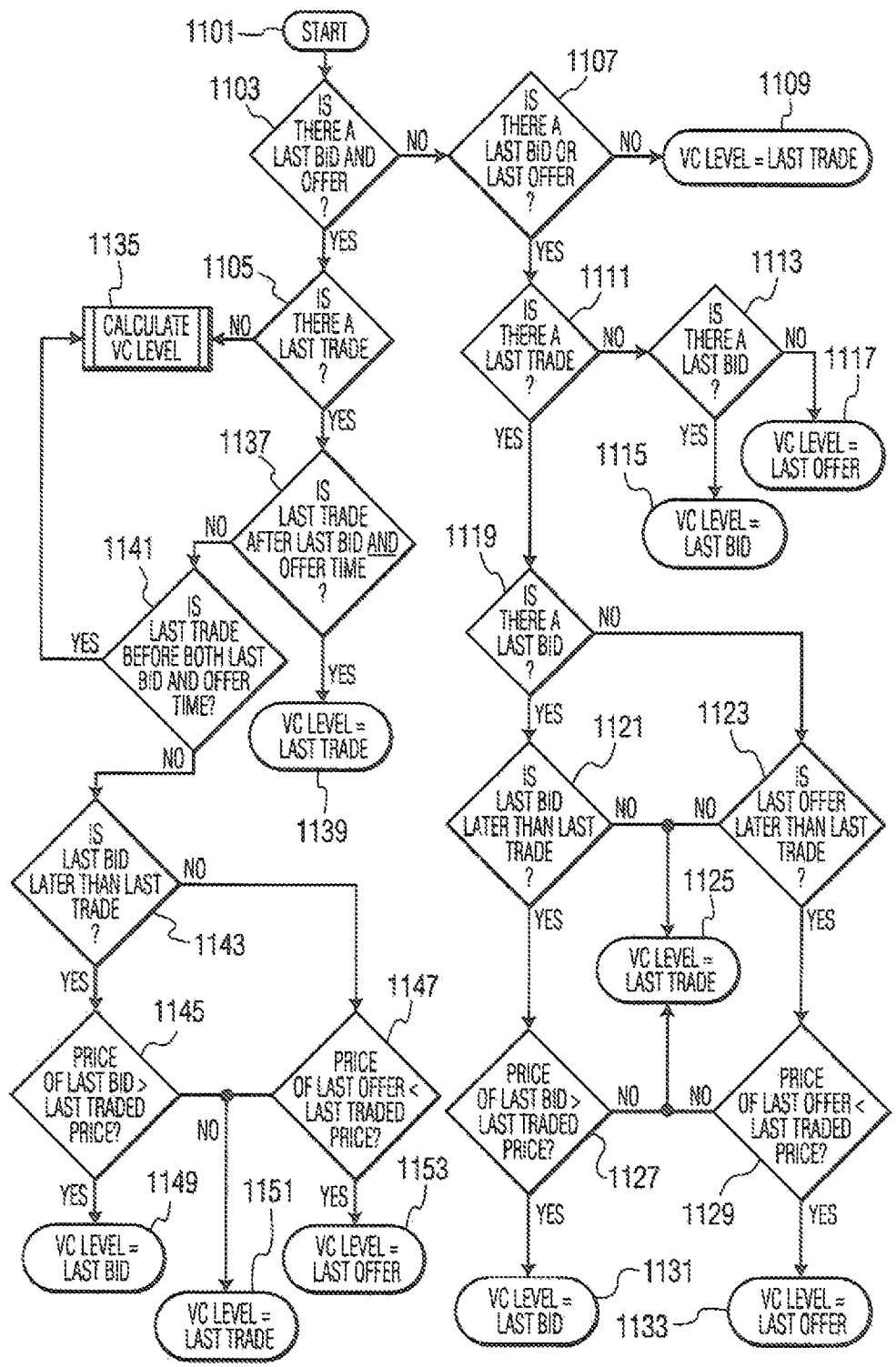
FIG. 11 is an exemplary decision tree for determining a volume clearing price level for a market order volume clearing session in accordance with one embodiment of the present invention.

FIG. 11 shows an exemplary decision tree for determining a volume clearing price level for a market order volume clearing session in accordance with one embodiment of the present invention. The exemplary decisioning process may start in step 1101. In step 1103, it may be determined whether there are both a last bid and a last offer. In this context, a last bid may be a most recent buy order during the trading day that was not filled, and a last offer may be a most recent sell order during the trading day that was not filled. A last trade is a most recent trade transaction that has been completed or agreed on during the trading day.

If there are both a last bid and a last offer, the process branches to step 1105. Otherwise, it may be determined in step 1107 whether there is either a last bid or a last offer. If neither a last bid nor a last trade exists, there must have been a last trade of this credit derivative due to the fact that it has been selected as one of the most liquid (i.e. most actively traded or of most interest to traders) during the trading day. Then, in step 1109, the volume clearing price level may be fixed at the price level of the last trade.

If it is determined in step 1107 that either a last bid or a last offer exists, it may then be determined in step 1111 whether there is a last trade. If not, the volume clearing price level will be fixed based on a determination in step 1113 as to whether there is a last bid. If there is a last bid, then, in step 1115, the volume clearing price level is fixed at the price level of the last bid. If there is a last offer instead, then, in step 1117, the volume clearing price level is fixed at the price level of the last offer.

If it is determined in step 1111 that a last trade exists, it may then be determined in step 1119 whether there is a last bid. If so, then in step 1121 it is determined whether the last bid is later in time than the last trade. If the last trade is later, then the volume clearing price level may be fixed at the price level of the last trade in step 1125. If the last bid is later than the last trade, then the price levels of the last bid and the last trade are compared in step 1127. If the last traded price is higher than the price level of the last bid, then the volume clearing price level may be again fixed at the price level of the last trade in step 1125. If the price level of the last bid is higher than the last traded price, then the volume clearing price level may be fixed at the price level of the last bid in step 1131.

If it is determined in step 1119 that there is not a last bid but a last offer, it may be determined in step 1123 whether that last offer is later in time than the last trade. If the last trade is later, then the volume clearing price level may be fixed at the price level of the last trade in step 1125. If the last offer is later than the last trade, then the price levels of the last offer and the last trade are compared in step 1129. If the last traded price is lower than the price level of the last offer, then the volume clearing price level may be again fixed at the price level of the last trade in step 1125. If the price level of the last offer is lower than the last traded price, then the volume clearing price level may be fixed at the price level of the last offer in step 1133.

Referring back to the top of the decision tree in step 1103, if it is determined that there are both a last bid and a last offer, it may then be determined in step 1105 whether there is a last trade. If not, the volume clearing price level may be calculated in step 1135 according to a method described herein below in connection with FIG. 12. If a last trade does exist, it may be determined in step 1137 whether the last trade is later than both the last bid and the last offer. If so, the volume clearing price level may be fixed at the price level of the last trade in step 1139. If not, it may be determined in step 1141 whether the last trade precedes both the last bid and the last offer. If so, the volume clearing price level may again be calculated in step 1135 according to a method described herein below.

If the last trade falls between the last bid and the last offer in terms of timing, then it may be determined in step 1143 whether the last bid is later in time than the last trade. If the last bid is later in lime then the last trade, then the price levels of the last bid and the last trade are compared in step 1145. If the last traded price is higher than the price level of the last bid, then the volume clearing price level may be fixed at the price level of the last trade in step 1151. If the price level of the last bid is higher than the last traded price, then the volume clearing price level may be fixed at the price level of the last bid in step 1149.

If the last trade is later in time then the last bid, (i.e., the last offer is later than the last trade), then the price levels of the last offer and the last trade are compared in step 1147. If the last traded price is lower than the price level of the last offer, then the volume clearing price level may again be fixed at the price level of the last trade in step 1151. If the price level of the last offer is lower than the last traded price, then the volume clearing price level may be fixed at the price level of the last offer in step 1153.

Figure 12:
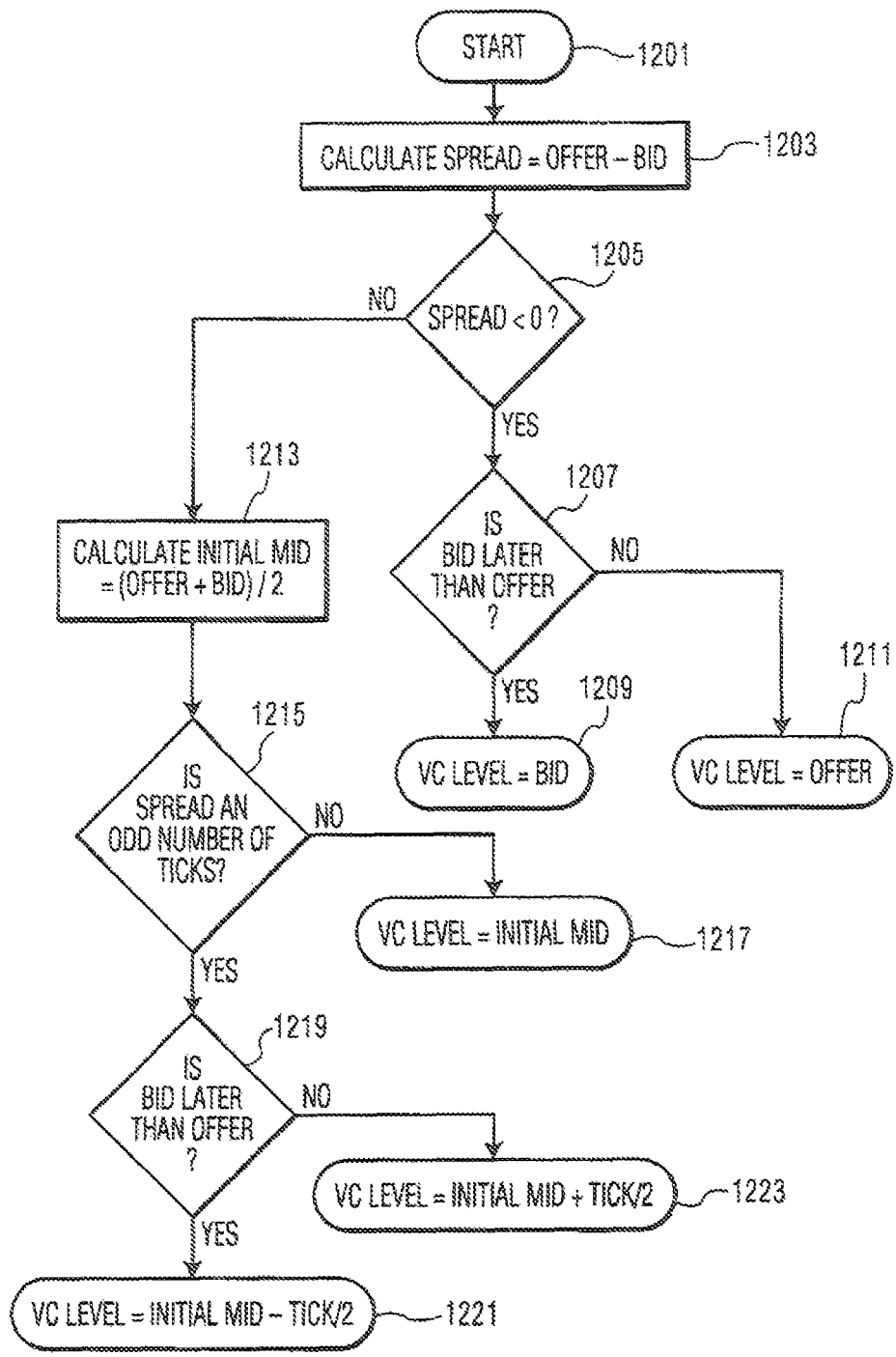
FIG. 12 is an exemplary decision tree for determining a volume clearing price level in certain scenarios in accordance with one embodiment of the present invention.

The aforementioned method for calculating the volume clearing price level in step 1135 is illustrated with another exemplary decision tree shown in FIG. 12. The method may start in step 1201. In step 1203, a spread may be calculated as the difference between the last offer and the last bid. In step 1205, it may be determined whether the spread is less than zero. If so, that means the last bid price is higher the last offer price and it may be determined in step 1207 whether the last bid is later in time than the last offer. If the last bid is later, then the volume clearing price level may be fixed at the price level of the last bid in step 1209. If the last offer is later, then the volume clearing price level may be fixed at the price level of the last offer in step 1211.

If it is determined in step 1205 that the spread is greater than or equal to zero, then an initial mid may be calculated, in step 1213, as the mean of the last bid price and the last offer price. Then, in step 1215, it may be determined whether the spread contains an odd number of price increments. If not, then in step 1217, the volume clearing price level may be fixed at the initial mid calculated in step 1213. If the spread docs contain an odd number of price increments, the volume clearing price level may depend on a determination in step 1219 as to whether the last bid is later in time than the last offer. If the last bid is later, the volume clearing price level may be fixed at the initial mid minus half a tick in step 1221. If the last offer is later, the volume clearing price level may be fixed at the initial mid plus half a tick in step 1223.

Referring back to FIG. 10, once a volume clearing price level has been determined for each selected credit derivative, then, in step 206, trading clients may be invited to submit orders for the selected credit derivatives within a time limit. Each buy or sell order may indicate a desired notional amount to be traded at the volume clearing price level that has been fixed in step 204. The submission of orders may be anonymous yet binding, as described above. That is, each participant only sees his or her own proposed orders but not those submitted by others. If an order is validated and accepted by the trading system, the order may be automatically executed without any further confirmation from the participant who submits the order, and the participant will be bound by the executed order.

In step 208, upon expiration of the time limit for order submission, the trading system may automatically match buy orders with sell orders. The order matching may be conducted according to one or more business rules or criteria. For example, the participants and/or their orders may be prioritized first, and the prioritization may be one factor in pairing up the orders. Additionally or alternatively, the orders may also be matched to maximize a total executable national amount and/or to minimize a total number of trading tickets to be issued.

In step 210, the trades may be completed at the volume clearing price level that has been fixed in step 204 and according to the matched orders.

FIG. 11A shows a table listing exemplary price scenarios and the resultant volume clearing price levels in accordance with one embodiment of the present invention. FIG. 11A may be viewed in connection with FIGS. 11 and 12. It should be noted that some of the price scenarios shown FIG. 11A may be unlikely to occur.

FIG. 11B shows a table presenting exemplary trading data related to real market order volume clearing sessions. In this example, only top two credit derivatives are shown for each European non-sovereign sector. In addition, as one timing variation, the search of the most liquid credit derivatives is focused on trades or orders created in the trading system after mid-day, making the volume clearing session effectively a half-day volume clearing.

FIG. 13 is a screen shot showing an exemplary control window through which market order volume clearing may be configured and controlled in an electronic trading system. The control window shows various fields where market order volume clearing parameters may be changed. For example, the market order volume clear function may be enabled by clicking a checkbox 1303. A launch time for the market order volume clearing session may be set in Field 1301. A lime for publishing the name selection of the most liquid credit derivatives (e.g., Top 5) may be specified in Field 1305. There may also be provided a list of the highest ranked credit derivatives and checkboxes 1307 for including or excluding each credit derivative from the market order volume clearing. The "Level" column shows volume clearing price levels that have been automatically fixed by the trading system according to the methods described above.

FIG. 14 is a screen shot showing an exemplary display of Top-5 single names in accordance with one embodiment of the present invention. At a predetermined publish time as shown in FIG. 13 (1305), all credit derivates (e.g. Top 5) that have been selected for market order volume clearing may be published in a window such as a "Top Single Names" (or "Top S/Ns") window shown in FIG. 14. The lop S/Ns window may list the five highest ranked credit derivative products, their respective terms, and information of the last trades. The information of the last trades may be periodically updated and may include a last traded price, a last traded notional amount, and an indication of whether the traded price was hit or lifted. Serving as an advance notice or invitation, the Top S/Ns window may be displayed and updated until a predetermined time for launching the market order volume clearing session.

FIG. 15 is a screen shot showing an exemplary volume clearing window a trade client may sec during a market order volume clearing session in accordance with one embodiment of the present invention. This window may be automatically displayed by the trading system or manually opened by a trader client upon some visual and/or audio alert. All the selected credit derivatives may be shown in the volume clearing window at the same lime and one or more licking clocks may count down the time remaining for entering orders. A flashing or static "EOD" icon next to a ticker may indicate that this is a market order volume clearing as differentiated from other types of volume clearing sessions. The volume clearing price levels are displayed. Each invited participant may enter Buy and/or Sell notional amount for each credit derivative. There may also be provided an option for a participant to re-post an order if it does not gel filled at the first attempt. That is, the market order volume clearing may be repeated if a first session does not cause sufficient volume to be traded or if significant trading interest (or unfilled orders) remains. In that case, a participant may simply allow the trading system to re-submit the previously unfilled orders.

Although the foregoing describes market order volume clearing as being preferably an integral part of the functionality of an electronic trading system, the market order volume clearing function may also be implemented as an add-on module. Such an add-on module may be selectively installed only for trading clients who are likely to participate in market order volume clearing sessions. In addition, the market order volume clearing methodology for trading credit derivatives may be easily adapted for trading of credit indices, single-name CDS products, tranches, options, as well as other types of financial instruments, as may be appreciated by those with ordinary in the art.

Limit Order Volume Clearing

The above-described market order volume clearing process helps increase trade volumes of the most liquid credit derivative products. There is also a need to increase trade opportunities for illiquid credit derivatives, such as single-name credit default swap (CDS) products, for practical reasons, it may not be desirable to perform volume clearing consistently on a fixed set of single-name CDS products. In addition, there is a greater potential for publicized trades to influence single-name CDS market as compared to credit indices. Based on these considerations, some embodiments of the present invention provide for a unique auction process for a variable set of illiquid credit derivative products, which process is referred to as "limit order volume clearing" (LOVC), or also known as "blind volume clearing."

Figure 16:
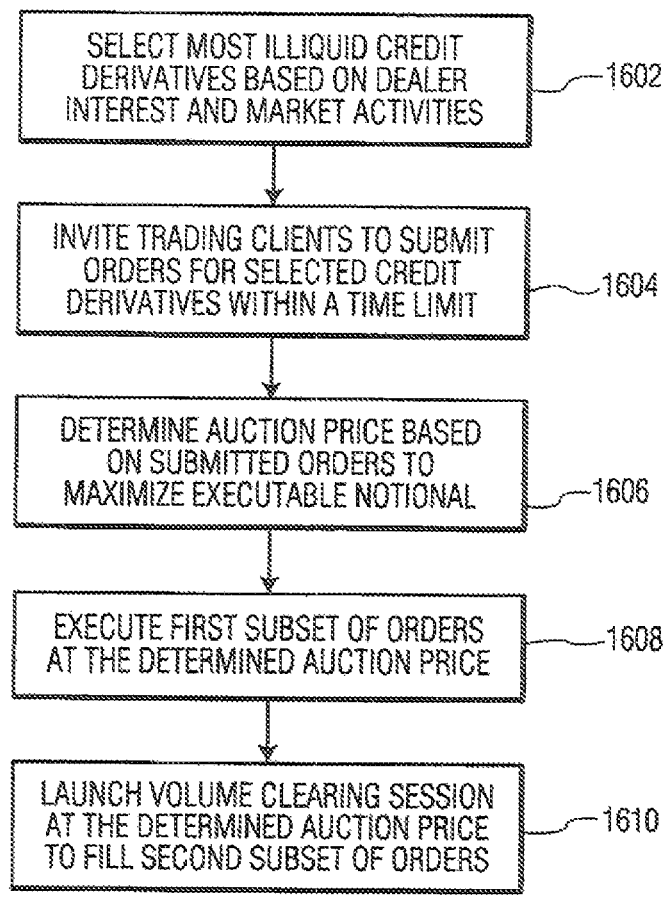
FIG. 16 is a flow chart illustrating an exemplary method of limit order volume clearing in accordance with one embodiment of the present invention.

FIG. 16 is a flow chart illustrating an exemplary method of limit order volume clearing in accordance with one embodiment of the present invention.

In step 1602, the most illiquid credit derivative products of a trading day (or other predetermined time period) may be selected. The liquidity (or illiquidity) of a credit derivative may be evaluated based on dealer interest in and market activities involving that credit derivative. The evaluation is typically done for a preceding trading period such as a trading day that is about to end, the previous few trading days, or a trading week. According to one embodiment, brokers may be allowed to pick a number of single name CDS products as the subject of limit order volume clearing for a particular day. The brokers' selections may be based on information from their clients and/or their knowledge of the credit market.

In step 1604, trading clients may be invited to submit their orders for the selected credit derivatives within a time limit. The order submission interface may be a window that looks somewhat similar to the fixing contribution window shown in FIG. 9A. Each invited participant may enter his or her buy or sell orders by indicating a bid/offer price and a desired notional amount for one or more of the credit derivatives selected in step 1602. A currency column may be provided for products capable of trading in multiple currencies. According to some embodiments of the present invention, a visual or audio alert may be employed to indicate concurrent trading interest in a credit derivative. For example, the line or cell corresponding to a particular credit derivative may be highlighted or flashing to indicate that someone else has placed an order on that credit derivative. However, there is no further detail disclosed as to the size or price of the other order. It is believed that the indication of other traders' interest in a credit derivative may be sufficient to pique the interest of a trader receiving such an alert. However, anonymity may be preferred until trades have been completed to prevent undue influence on the market.

In one embodiment of the present invention, trader clients may be allowed to specify only a desired volume to trade without providing a bid or offer price. Such an order may be referred to as a market order. The market order may be then placed in the order book and the participant agrees to trade the desired volume at what ever auction price is fixed in the price determination phase.

In step 1606, an auction price may be determined based on the submitted orders to maximize a total executable notional amount. All buy and sell orders submitted before the time limit expires may be considered.

Figure 17:
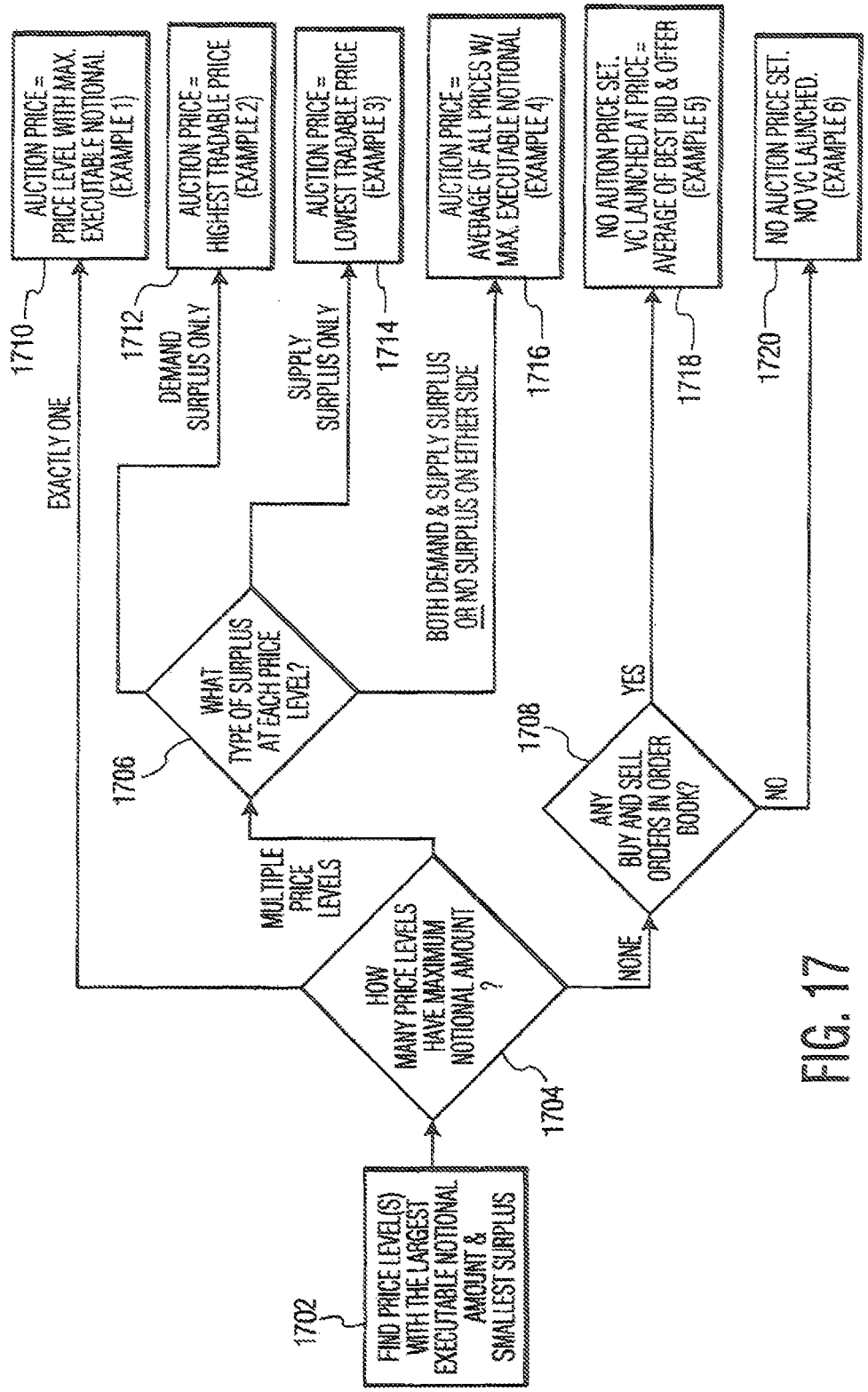
FIG. 17 is an exemplary decision tree for determining an auction price for limit order volume clearing in accordance with one embodiment of the present invention.

According to some embodiments of the present invention, the price determination in step 1606 may follow an exemplary decision tree as shown in FIG. 17. The decisioning process may be started by searching for price level(s) with the largest executable notional amount and smallest surplus in step 1702. The buy orders may be sorted in ascending order of bid price and the sell orders may be sorted in descending order of offer price. Order submission time may be further used as tie-breakers, such that orders with equal prices will be sorted with the earlier submitted order receiving a higher rank. Then, the sorted buy orders and sell orders may be line up to calculate the total executable notional amount at each price level. As a result, one or more price levels with the largest executable notional amount may be found.

Then, in step 1704, it may be determined as to how many price levels have the (same) maximum executable notional amount.

Figure 20:
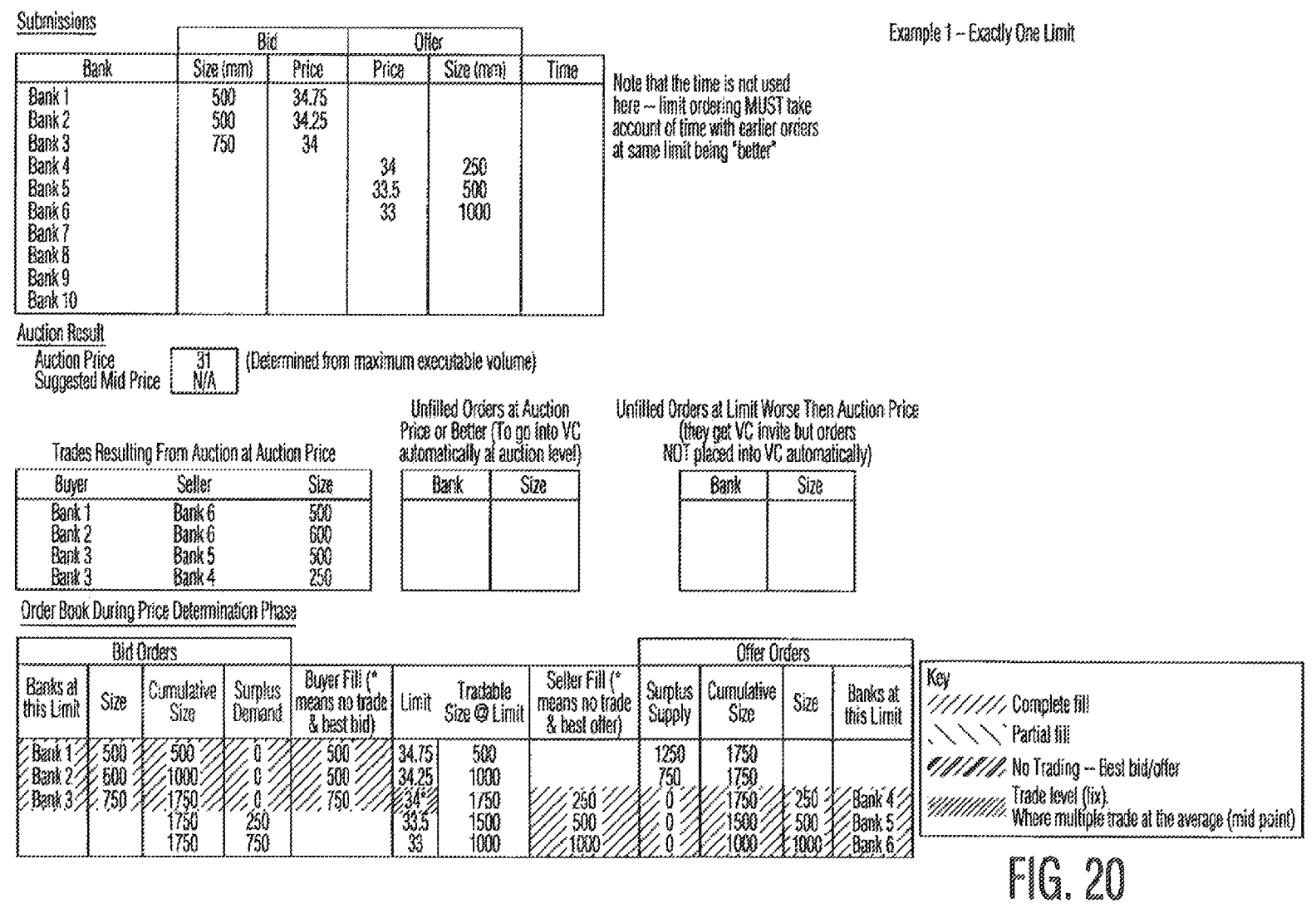

If there is exactly one price level that has the maximum executable notional amount but the smallest surplus, the auction price may be fixed at that price level in step 1710. A surplus refers to the total notional amount of unfilled orders. An exemplary set of order submissions, auction results, and order book data for this scenario is shown in FIG. 20 as Example 1.

If multiple price levels exist with the maximum executable notional amount, then it may be determined in step 1706 what type of surplus is produced at each of the multiple price levels. When a surplus occurs on the bid side, the surplus is referred to as a demand surplus. When a surplus occurs on the offer side, the surplus is referred to as a supply surplus.

Figure 21:
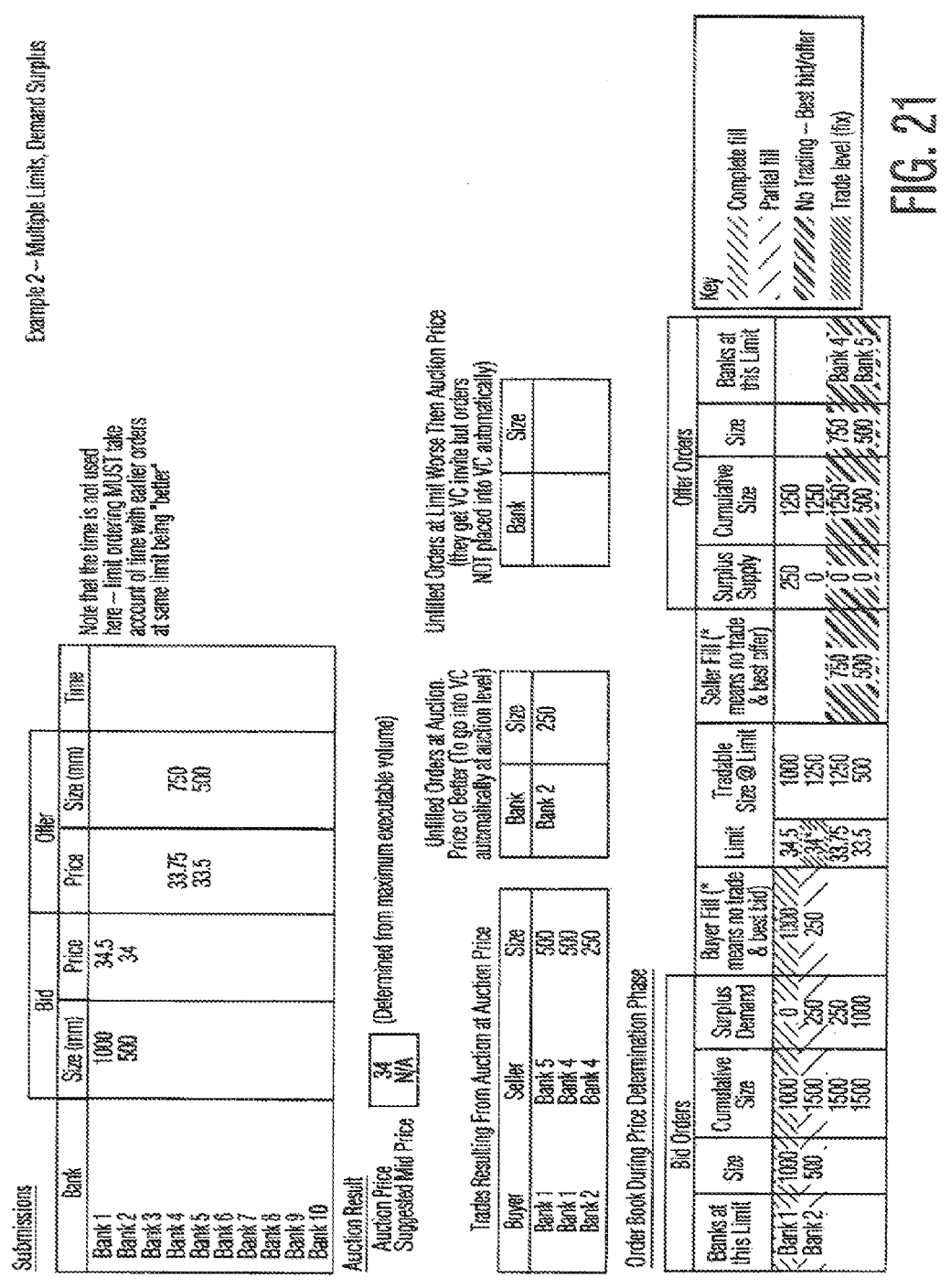

If it is determined in step 1706 that only demand surplus exists for the multiple price levels, the auction price may be fixed at the highest tradable level in step 1712. An exemplary set of order submissions, auction results, and order book data for this scenario is shown in FIG. 21 as Example 2.

Figure 22:
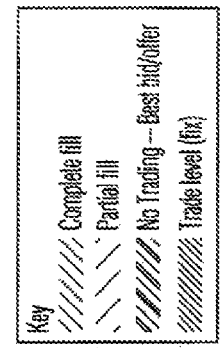

If it is determined in step 1706 that only supply surplus exists for the multiple price levels, the auction price may be fixed at the lowest tradable level in step 1714. An exemplary set of order submissions, auction results, and order book data for this scenario is shown in FIG. 22 as Example 3.

Figure 23:
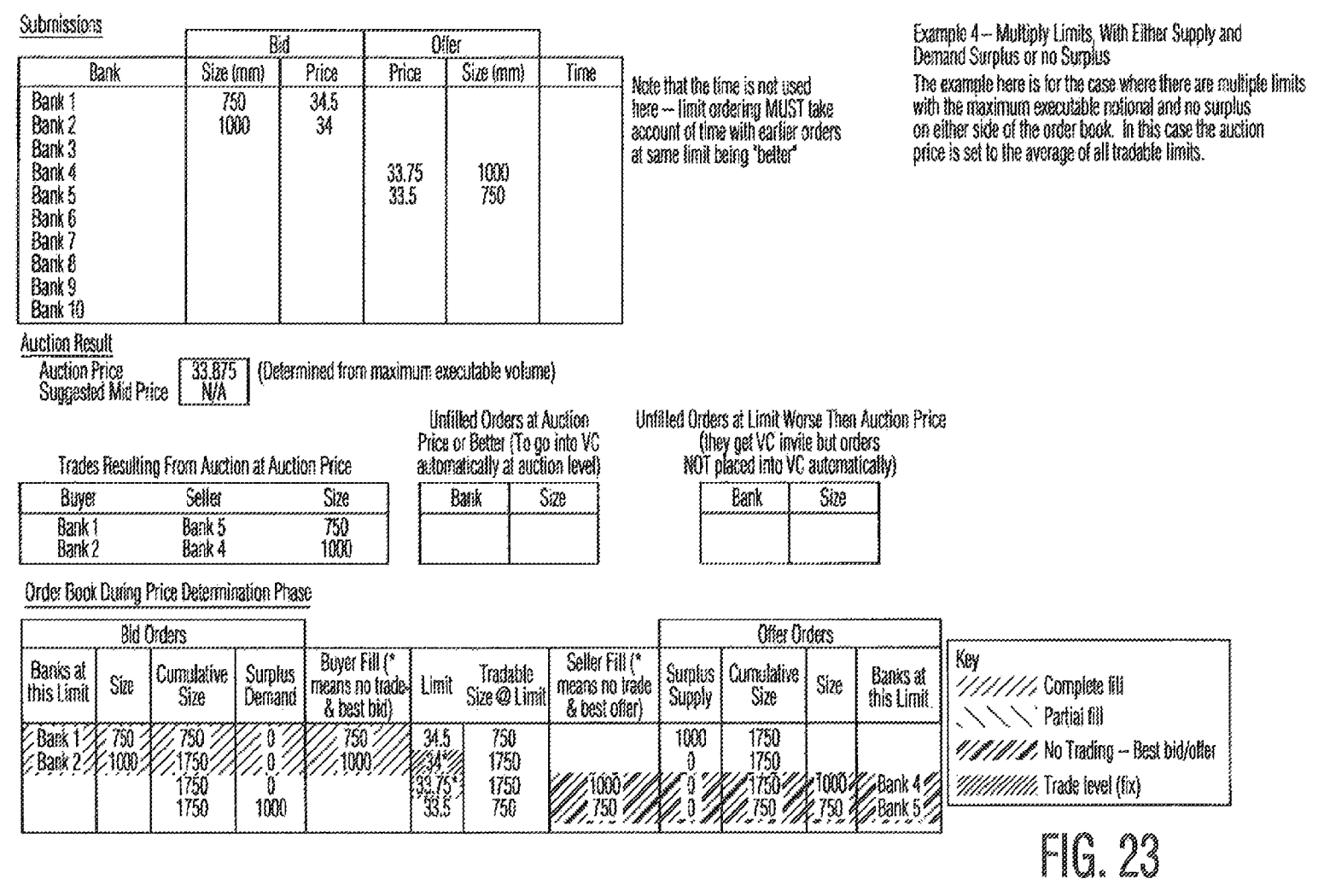

If it is determined in step 1706 that the surplus is split between buy and sell sides or there is no surplus at any of the price levels with maximum tradable volume, then the auction price may be fixed at the average of all the price levels in step 1716. An exemplary set of order submissions, auction results, and order book data for this scenario is shown in FIG. 23 as Example 4.

Referring back to step 1704 in FIG. 17, if it is determined that none of the buy and sell orders touch or cross, then there is no price level at which trades can be executed. In that case, it may be determined in step 1708 whether there are both buy and sell orders in the order book. If both buy and sell orders exist, then no auction price is set but a volume clearing price may be set, in step 1718, at the average of the best bid price and the best offer price. A volume clearing session may then be launched at that averaged price level. An exemplary set of order submissions, auction results, and order book data for this scenario is shown in FIG. 24 as Example 5.

If it is determined at step 1708 that either buy or sell orders do not exist, then, in step 1720, no auction price will be set and no volume clearing session will be launched. An exemplary set of order submissions, auction results, and order book data for this scenario is shown in FIG. 25 as Example 6.

For a further illustration of how to determine the auction price, a numerical example involving six banks (Bank 1, Bank 2, . . . Bank 6) is shown in FIGS. 26A-C.

FIG. 26A shows order submitted by Banks 1-6 respectively, each order being either a bid or an offer and each including a notional amount ("Size" in millions) and a price ("Price" in bps). From this simplified example, it may be noted that there are three tradable price levels or limits, 40, 60 and 64.

FIG. 26B shows a view of the order book listing both the limits submitted by the banks and the resulting surpluses at each limit. The limits are listed in a descending order starting from 67 and down to 30. At 67 bps, the limit submitted by Bank 4, there is no tradable notional amount, the demand surplus is zero, and the supply surplus is 150 MM. Therefore, the total surplus is the sum of the demand surplus and the supply surplus, 150 MM. Similarly, at 64 bps, there is 50 MM tradable, the demand surplus is zero, and the total surplus is 50 MM. At 60 bps, there is 50 MM tradable, and the total surplus is 50 MM. At 40 bps, there is 50 MM tradable, and the total surplus is 50 MM. At 30 bps, there is no tradable notional amount, and the total surplus is 125 MM.

Based on the order book shown in FIG. 26B, the auction price may be fixed (in FIG. 26C) at 60 bps by maximizing total tradable notional amount and minimizing total surplus. In this particular example, there are three price levels—40, 60 and 64 bps—that lead to the same tradable notional amount, 50 MM. If these three levels caused the same amount of total surplus, then, according to some embodiments, the median price level (i.e., 60 bps here) or an average of the three would be chosen as the auction price level, unless a last traded price exists. If a last traded price exists, a price level closest to the last traded price may be chosen from the three equally viable prices in order to minimize volatility.

Referring back to FIG. 16, once an auction price has been determined in step 1606, a first subset of the submitted orders may be executed at the fixed auction price. The first subset of orders are those executable at the auction price and may be matched to minimize the total number of trade tickets issued. Trades may be executed at the auction price between counterparties with bid and offer prices equal to or better than the auction price. According to one embodiment of the present invention, the orders may be tilled in the order of best to worst price. That is, buy orders with the best bid price are matched with sell order with the best offer price, and so on. Where there is more than a single order at a particular price level on either the buy or sell side, the time that the orders are submitted may be used to break a tie, with an earlier submitted order taking precedence. At the end of step 1608, a maximum amount of orders will have been traded based on the submitted orders.

In an actual real-time electronic trading system, steps 1606 and 1608 (i.e. price determination and auction execution phases) will take very little time to complete. Then, in step 1610, a volume clearing session may be launched at the determined auction price to fill a second set of orders. The second set of orders may include a second subset of orders submitted in step 1604 (the order submission phase) but remain unfilled at the end of step 1608. The second set of orders may further include additional orders solicited from invited participants during another limited time period.

Figure 18:
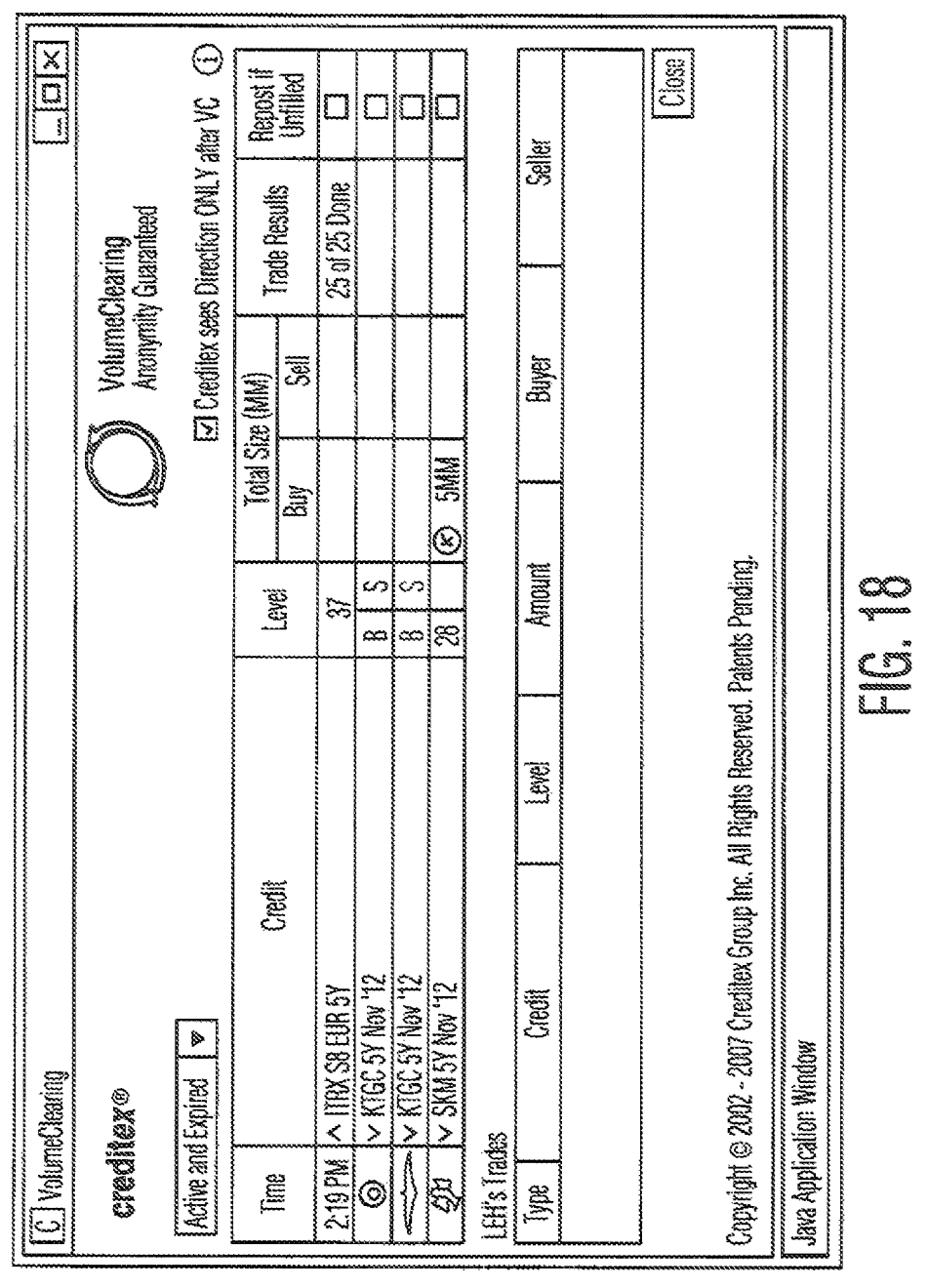

FIG. 18 is a screen shot showing an exemplary volume clearing window a trade client may see during the order submission phase of a limit order volume clearing session. As shown, the trade client has submitted a buy order for 5-year-term SKM (due in November 2012) at a bid price of 28 bps with a desired notional of 5 MM.

FIG. 19 is a screen shot showing an exemplary volume clearing window a trade client may see during the volume clearing phase of a limit order volume clearing session. As shown, the trade client has placed a buy order for 10 MM of 5-year-term SKM at 29 bps as well as a sell order of 5 MM of 5-year-term KTGC at 35 bps.

While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalents.

The invention claimed is:

1. An online trading system, comprising:
a database configured to store information for certain reference entities;
memory configured to store execution instructions; and
a processor coupled with the database and the memory, the processor configured to execute the instructions, the instructions configured to cause the system to:
receive from each of a plurality of trader clients a position for a financial instrument associated with a reference entity, the position having either a buy or sell position and a price and a notional;
receive an acceptance from a transacting trader client to the position for the financial instrument of one of the plurality of trader clients;
invite a selected plurality of trader clients, based on predefined criteria, to transact at the price of the accepted position;
receive a position for the financial instrument from a number of the selected trader clients in response to said invitation;
match the received positions of the plurality of selected trader clients to each other based on the notional of each position; and
finalize the transactions of all positions which are matched at the plice of the accepted position.

2. The system of claim 1, wherein the instructions are further configured to cause the system to offer each of the plurality of trader clients a new notional for trading at a specific price, and receive a confirmation from one of the plurality of trader clients.

3. The system of claim 1, wherein the instructions are further configured to cause the system to invite the plurality of selected trader clients based on knowledge of prior trader client behavior with respect to the financial instrument.

4. The system of claim 1, wherein the system is caused to match the positions of the plurality of trader clients by assigning to each trader client a priority and by matching the highest priority trader client with a counterparty with a notional equal to the position of the highest priority trader client.

5. The system of claim 1, wherein the system is caused to match the positions of the plurality of trader clients by further matching each of the plurality of trader clients with a counterparty based on the priority and the notional.

6. A computer implemented method for online trading of financial instruments, comprising:
receiving, via a computing device comprising a processor executing program instructions, from each of a plurality of trader clients a position for a financial instrument associated with a reference entity, the position having either a buy or sell position and a price and a notional;
receiving via the computing device an acceptance from a transacting trader client to the position for the financial instrument of one of the plurality of trader clients;
inviting via the computing device a selected plurality of trader clients, based on predefined criteria, to transact at the price of the accepted position;
receiving via the computing device a position for the financial instrument from a number of the selected trader clients in response to said invitation;
matching via the computing device the received positions of the plurality of selected trader clients to each other based on the notional of each position; and
finalizing via the computing device the transactions of all positions which are matched at the price of the accepted position.

7. The computer implemented method of claim 6, further comprising:
offering each of the plurality of trader clients a new notional for trading at a specific price; and
receiving a confirmation from one of the plurality of trader clients.

8. The computer implemented method of claim 6, further comprising:
offering each of the plurality of trader clients a change in the notional of the position and receiving a new notional request from one of the plurality of trader clients.

9. The computer implemented method of claim 6, further comprising:
selecting a plurality of invited trader clients to participate in the transaction at the price of the accepted position based on knowledge of prior trader client behavior with respect to the financial instrument.

10. The computer implemented method of claim 6, wherein the matching the positions of the plurality of trader clients comprises:
assigning to each trader client a priority; and
matching the highest priority trader client with a counterparty with a notional equal to the position of the highest priority trader client.

11. The computer implemented method of claim 10, wherein the matching the positions of the plurality of trader clients further comprises matching each of the plurality of trader clients with a counterparty based on the priority and the notional.

* * * * *